US007644019B2

(12) United States Patent
Woda et al.

(10) Patent No.: US 7,644,019 B2
(45) Date of Patent: Jan. 5, 2010

(54) SAFE TRANSACTION GUARANTY

(75) Inventors: Steven L Woda, Washington, DC (US); Jeffrey E Grass, Hermosa Beach, CA (US)

(73) Assignee: Buysafe, Inc., Alexandria, VA (US)

( * ) Notice: Subject to any disclaimer, the term of this patent is extended or adjusted under 35 U.S.C. 154(b) by 1239 days.

(21) Appl. No.: 10/419,269

(22) Filed: Apr. 21, 2003

(65) Prior Publication Data

US 2004/0210527 A1    Oct. 21, 2004

(51) Int. Cl.
    G06Q 40/00    (2006.01)
(52) U.S. Cl. .............................. 705/35; 705/37; 705/38; 705/39
(58) Field of Classification Search .................. 705/35, 705/37, 38
    See application file for complete search history.

(56) References Cited

U.S. PATENT DOCUMENTS

| 6,549,888 | B1 | 4/2003 | Aieta et al. | |
|---|---|---|---|---|
| 6,839,689 | B2 | 1/2005 | Aieta et al. | |
| 2001/0039524 | A1* | 11/2001 | Harrison, Jr. et al. | 705/35 |
| 2003/0033240 | A1* | 2/2003 | Balson et al. | 705/37 |

OTHER PUBLICATIONS

Gassen, Timothy. "Robby the Robot would marvel at how he is sold." Arizona Daily Star. Feb 22, 1999., p. 7E.*
§ WLI BuyerAssurance.com: Online Incentives Boost Revenue, Turning e-Commerce Browsers into Loyal Customers—Customized, Branded Instant Rewards Differentiate Online Merchant's Web Site With Best Price Guarantees, Extended . . . Business Wire Wednesday, Oct. 1, 2003.*
§ BuyBidWin.com Offers SatisFusion's After Sales Support Platform On Its E-Store Front Dateline: Long Beach, Calif., May 8, 2001.*
http://www.simplebond.com, "Online Surety Bond Applications", Jun. 12, 2003, 3 pages.
Tradesafe.com, "The Company—Tradesafe.com—empowering sellers and protecting buyers", 1999-2000, 3 pages.
Tradesafe.com, "Buyer's Guide", 1999-2000, 1 page.
Tradesafe.com, "Welcome to Tradesafe Payments", 1999-2000, 2 pages.
Tradesafe.com, "Tradesafe.com™ Chosen by AuctionWatch.com To Provide Guaranteed Payment Service For Online Buyers and Sellers", News Release, Jul. 25, 2000, 2 pages.
Tradesafe.com, "Tradesafe.com™ Receives $10 Million in Venture Funding from Germany's IQ Capital", News Release, Mar. 13, 2000, 2 pages.
Tradesafe.com, "Tradesafe.com™ Partners with Online Auction Site boxLot.com for On-Line Payment Service", News Release, Dec. 17, 1999, 2 pages.

(Continued)

Primary Examiner—Alexander Kalinowski
Assistant Examiner—Abhishek Vyas
(74) Attorney, Agent, or Firm—Barnes & Thornburg LLP

(57) ABSTRACT

A method and system is provided for safe online commercial transaction. When a safe transaction service provider receives a request from a first party for obtaining a transaction performance guaranty service, the safe transaction service provider processes the request by underwriting the first party. If the underwriting is successful, the transaction performance guaranty service is provided to the first party which binds a transaction performance guaranty to an online commercial transaction involving the first party and guarantees the first party's performance when the first party and a second party enter the online transaction.

52 Claims, 22 Drawing Sheets

OTHER PUBLICATIONS

Tradesafe.com, "Tradesafe.com™ Chosen by Lycos to Provide Online Escrow Service", News Release, Oct. 1, 1999, 2 pages.
Tradesafe.com, "Opoly Enterprises Teams with Tradesafe.com™ to Protect Users Against Online Frauds", News Release, Apr. 25, 2000, 2 pages.
Tradesafe.com, "Seller's Guide", 1999-2000, 2 pages.
Tradesafe.com, "Being a Seller—Being a Buyer", 1999-2000,4 pages.
Tradesafe.com, "TradeSafe Online Corporation", 1995-1999, 1 page.
Tradesafe.com, "Internet Archive WayBackMachine", 2001, 1 page.
Tradesafe.com, "The Tradesafe Payments Guarantee", 1999-2000, 2 pages.
Tradesafe.com, "Transactions over $1200", 1999-2000, 2 pages.
Tradesafe.com, "What is 1StepSurety?", Jan./Feb. 1999, 3 pages.
Tradesafe.com, "Why are we special?", Jan./Feb. 1999, 1 page.
Tradesafe.com, "Commerical Surety", Jan./Feb. 1999, 1 page.
Tradesafe.com, "What is 1StepSurety", Jan./Feb. 1999, 1 page.
The Hartford Group Inc., "New Bond System Goes One Step Beyond", Jan. 2001, 4 pages.
www.findarticles.com/p/articles/mi_m0BJK/is_14_11/ai_67315633, "Marsh Debuts Online Guarantee Program", Nov. 2000, 2 pages.
Suretybond.com, 2000, 1 page.
Suretybond.com, "How Does Suretybond.com Benefit Exchanges", 2000, 2 pages.
Suretybond.com, "SuretyBond guarantees online deals get done", 2000, 2 pages.
InSure Vision, "Welcome to IVT", Sep. 15, 2003, 1 page.
InSure Vision, "What's New", News Archive, Feb. 12, 2001-Sep. 15, 2003, 1 page.
InSure Vision, News Archive, Oct. 28, 1999-Nov. 27, 2000, 1 page.
InSure Vision, "About IVT—Corporate Overview", 1999-2000, 1 page.
InSure Vision, "InSure Vision Technologies, LLC Announces the Opening of East Coast Office", Jan. 5, 2000, 1 page.
InSure Vision, "InSure Vision Technologies, LLC Welcomes Aboard Thomas Rutherfoord, Inc.", Rutherford, Inc. Dec. 29, 1999, 1 page.
InSure Vision, InSure Vision Technologies, LLC Announces Alliance with CNA Surety, Oct. 28, 1999, 1 page.
InSure Vision, "InSure Vision Technologies, LLC Releases SurePath 1.3", Jul. 5, 2000, 1 page.
www.insurancejournal.com/news/national/2000/07/18/11203.htm, "Esurety Launches Agent Web Site", Jul. 18, 2000, 2 pages.
"CorpHQ Announces E-Commerce Partnership With Contractors Bonding and Insurance Co.", Business Wire Article, May 26, 1999, 2 pages.
www.findarticles.com/p/articles/mi_mi_m0EIN/is_1999_Dec_6/ai_58036443/print, "Repeat/Esurance Secures $34 Million in Second Round of Financing; First Multi-State Internet Insurance Company Receives Funding From Prominent Silicon Valley Venture Capital Firms", Nov. 19, 2004, 16 pages.
Internet Archive Wayback Machine, 2001, 5 pages.
InSure Vision Technologies, "The Bonding of Tradition and Technology", 2 pages.
InSure Vision, "What's New", News Release, Oct. 28, 1999-Mar. 20, 2000, 1 page.
InSure Vision, "SurePath—Security Bond Processing", Feb. 9, 2005, 1 page.
InSure Vision, "SurePath Demo", Feb. 9, 2005, 3 pages.
InSure Vision, "SurePath Demo", Feb. 9, 2005, 1 page.
www.insurancejournal.com/news/national/2000/05/11/11012.htm, "E-Surety.net Unveils Surety Bond Site," May 11, 2000, 2 pages.
Internet Archive Wayback Machine, 2001, 1 pages.
web.archive.org/web/20010208094919/www.webtradeinsure.com, "Auction Sites", Feb. 10, 2005, 1 page.
web.archive.org/web/20001102115648/www.webtradeinsure.com, "Frequently Asked Questions", Feb. 10, 2005, 1 page.
web.archive.org/web/20000619212149/www.webtradeinsure.com, "Get Coverage", Feb. 10, 2005, 3 pages.
web.archive.org/web/20010208104347www.webtradeinsure.com, "Sellers", Feb. 10, 2005, 2 pages.
web.archive.org/web/20000407174703/www.webtradeinsure.com, "About WebTradeInsure", Feb. 10, 2005, 1 page.
www.dovebid.com/company/news/pr_000906_transaction.asp, "Dovebid® Announces Seven New Transaction Support Services", Press Release, Sep. 6, 2000, 4 pages.
www.purchasing.com/article/CA139426.html, "Net Services", Newsletter, Aug. 24, 2000, 2 pages.
www.antiquesandthearts.com/AnatomyLesson.asp?d=Archive20, "Online Insurance", Feb. 11, 2005, 2 pages.
www.auctionpatrol.com/Auction_Resources/more2.html, "Auction Resources", 2001-2004, 7 pages.
www.insurancejournal.com/news/west/2000/07/28/12068.htm, "Calif. Company Offers Coverage for Online Auction Purchases", Jul. 28, 2000, 1 page.
www.infosecuritymag.techtarget.com/articles/august00/departments3_n, "On the Cutting Edge", Aug. 2000, 8 pages.
www.auctionbytes.com/cab/abu/y200/m12/abu0027/s07, "This and That", Dec. 3, 2000, 2 pages.
www.vendio.com/service/tipsandtactics/buy-insurance.html, "Understanding Insurance", 1998-2005, 3 pages.
Great American Insurance's Electronic Surety: Online Notary Bonds; www.electronicsurety.com; Jul. 2, 2003.
Esuretybond.com; www.esuretybond.com/ Jul. 2, 2003.
The Bond Agency.com; www.thebondagency.com; Jul. 2, 2003.
South Coast Surety Insurance Services Inc.; www.southcoastsurety.com; Jul. 2, 2003.
"Selling fidelity and surety bonds is about to get a lot faster for agents", HTFD Financial Services Group Inc., Agent Magazine, Jan./Feb. 1999, 2 pages.
"New Bond System Goes One Step Beyond", HTFD Financial Services Group Inc., Agent Magazine, Jan./Feb. 1999, 1 page.

\* cited by examiner

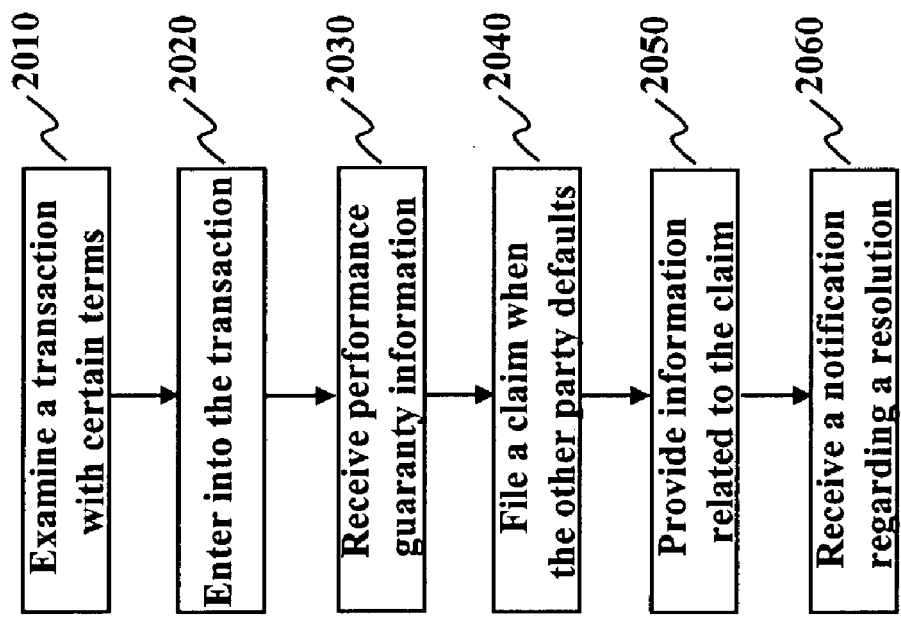

US 7,644,019 B2

SAFE TRANSACTION GUARANTY

BACKGROUND

1. Field of Invention

The inventions presented herein relate to methods and systems for conducting reliable transactions in an electronic commerce (e-commerce) environment. More specifically, the inventions relate to methods and systems providing a performance guaranty in a transaction.

2. Discussion of Related Art

The rapid growth in the Internet technologies and electronics has presented us with new ways for us to conduct transactions with one another. Goods are now offered for sale over the Internet. Interested purchasers can view those goods through a variety of interfaces installed on various types of electronic devices. Placing an order may be a matter of a click. An advertisement for sale of a product or a service may be posted at anytime from anywhere. So is a purchase order. All is done without having to go through the conventional process of interfacing with a human, directly or even indirectly.

E-commerce transactions have become quite efficient, but not without a price. Fraudulent transactions may occur more easily in an e-commerce environment. Without the advantages that a conventional transaction interface may have (e.g., take possession of the goods to examine the quality, validate a credit card or examine a check before a transaction occurs), a bad faith party may easily take advantage of the easy-to-use electronic links to commit fraud in the cyber space. For example, a seller may post an item for sale on one of the many auction sites. After receiving payment from a successful bidder, the seller may fail to deliver the item purchased at auction. Likewise, a buyer may make no payment when due after an ordered product has been shipped by the seller and received by the buyer.

Various attempts have been made to find solutions for these new transactional problems. One approach involves the use of "escrow". The concept of escrow is to use the services of a trusted third party to ensure a reliable transaction. Parties to a transaction deliver their performance to the trusted third party who then delivers to each party what they should receive. For example, an auction item seller may deliver the item to the trusted third party and the buyer may send the payment to the trusted third party. The trusted third party then sends the payment to the seller and the item to the buyer. If either party fails to perform, the trusted third party will not complete the transaction. One disadvantage of this solution is that it introduces a delay into the transaction.

Another solution is to introduce a collateral in the form of a performance bond. A party, e.g., a seller, who intends to be engaged in electronic transactions may use his credit card as a collateral at a third party, e.g., a performance bond service provider. The performance bond service provider is pre-authorized to charge the seller's credit card for a certain amount called, for example, a penal sum. The service provider holds this pre-authorized penal sum as a security. Under this security, one single blanket coverage is provided, up front, to cover all transactions involving the seller up to the panel sum. The seller's performance in transactions under the coverage is guaranteed. When the seller defaults, the performance bond service provider charges, under the pre-authorization, the seller's credit card to remedy the default.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 20 is a flowchart of an exemplary process, in which a party who is a beneficiary of a transaction performance guaranty operates in compliance with the terms defined by the transaction performance guaranty, according to an embodiment of the inventions.

DETAILED DESCRIPTION

Figure 1:
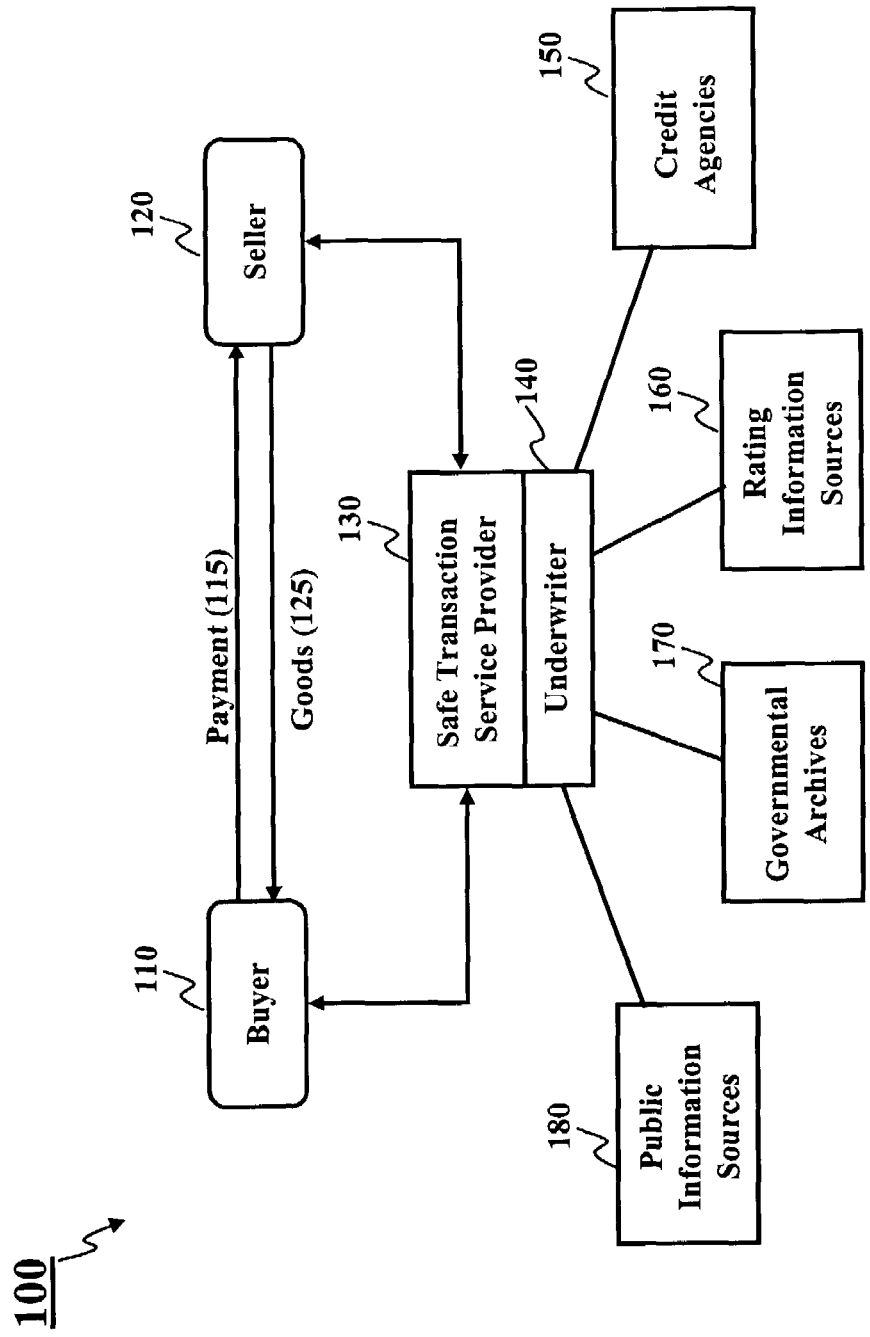
FIG. 1 depicts a framework in which a safe transaction service provider provides a transaction performance guaranty for a transaction involving a party who obtains the safe transaction service through an underwriting process, according to an embodiment of the inventions.

FIG. 1 depicts a framework 100 in which a safe transaction service provider provides a transaction performance guaranty for a transaction involving a party who obtains the safe transaction service through an underwriting process, according to one embodiment of the inventions. The underlying transaction involves a buyer 11 and a seller 120. There may be a contract between the buyer 110 and seller 120 including a plurality of contractual terms associated with the underlying transaction. Such terms may include, but are not limited to, a description of goods, a sale price, a delivery date, a specified payment method, and certain quality measures related to the goods involved. According to such contractual terms, the buyer 110 has a duty to make a payment (115) for the goods involved and the seller 120 has a duty to deliver the goods (125).

A safe transaction service provider 130 provides a transaction performance guaranty service to a party involved in the transaction. The party receiving the transaction performance guaranty service is a service subscriber, i.e. a party who pays a fee to subscribe to the services of the safe transaction service provider, which may be either the buyer 110 or the seller 120. The subscription may be termed with respect to a predetermined fixed period (e.g., 6 months) or may be termed with respect to a total coverage in terms of a dollar amount, or a hybrid.

The transaction performance guaranty service, which may be obtained for a fee, provides a separate performance guaranty on behalf of its subscriber for each transaction involving the subscriber. The guaranty may be exercised in case of default by a party to the transaction. A default may be defined as a violation of a term associated with a transaction agreement. For example, if the seller 120 subscribes to the performance guaranty service and fails to deliver goods in a particular transaction, a buyer involved in the same transaction may exercise the guaranty and file a claim to the safe transaction service provider 130.

A transaction performance guaranty service agreement may provide an indemnity clause, which requires a service subscriber to indemnify, under certain condition, the safe transaction service provider 130 for a payout that it has made. For example, if a claim is filed against the service subscriber who is subsequently determined to be at fault and the safe transaction service provider 130 compensated the party who filed the claim, the safe transaction service provider may seek reimbursement from its subscriber.

Figure 2:
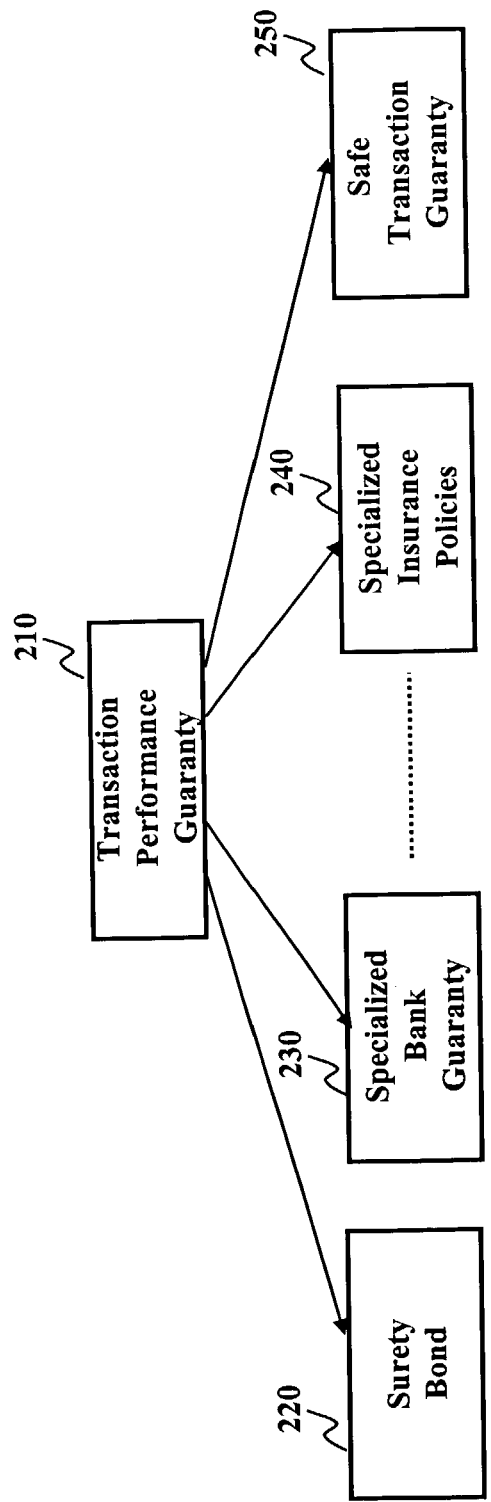
FIG. 2 illustrates different exemplary forms in which a transaction performance guaranty can be provided, according to an embodiment of the inventions.

The transaction performance guaranty may be provided in a variety of different forms. FIG. 2 illustrates different exemplary forms in which a transaction performance guaranty 210 may be provided, according to an embodiment of the inventions. It may be offered in the form of a surety bond 220, a specialized bank guaranty 230, . . . , a specialized insurance policy 240, or in a form of a safe transaction guaranty 250. The safe transaction service provider 130 may provide various forms of a performance guaranty. It may also provide other forms of guaranty based on its agreement with other institutions. The safe transaction service provider 130 may provide its own guaranty in the form of, for instance, the surety bond 220 and the safe transaction guaranty 250. The safe transaction service provider 130 may also provide a performance guaranty in forms supported by other institutions such as the specialized bank guaranty 230 supported by a bank or the specialized insurance policy 240 (or surety bond) supported by an insurance company.

The transaction performance guaranty service may be offered in a transaction driven mode, i.e. protection is provided for only a particular transaction. That is, the service binds a performance guaranty to each individual transaction involving the subscriber separately. The subscriber may obtain a transaction performance guaranty service before any transaction is in progress. Whenever an individual transaction is initiated, the subscriber may register the transaction with the safe transaction service provider 130 with information provided relating to this particular transaction (e.g., price). At this point, the safe transaction service provider 130 then binds a transaction performance guaranty to the registered transaction. Therefore, each individual transaction has a different performance guaranty associated with it. If the performance guaranty is provided in the form of a surety bond, each individual transaction has a different surety bond.

The transaction performance guaranty service may be provided at different stages of a transaction. For example, service may be engaged during the negotiating stage of a transaction (before an underlying agreement is completed between buyer and seller). When a transaction is registered and before it closes, the transaction performance guaranty service may provide a simple binding between a performance guaranty and the underlying transaction. This may serve as an indication to the parties involved that there is a performance guaranty provided for a particular party (or parties). Such an indication may promote the negotiation or bidding process preliminary to entering into a binding contract between the parties.

When a transaction closes, the focus regarding an underlying transaction may shift from negotiation/bidding to actual performance. All of the parties may not be known until the transaction closes. For example, in an auction where the seller is a subscriber of the transaction performance guaranty service, it is not clear until there is a successful bidder at the close of the auction who the buyer will be. The safe transaction service provider 130 may not be certain who will be the beneficiary under the performance guaranty provided on behalf of the subscriber (auction seller). Therefore, the safe transaction service provider 130 may actually issue a performance guaranty only after the underlying transaction is closed and the performance guaranty can be provided to the appropriate party, such as the successful auction bidder.

Figure 3:
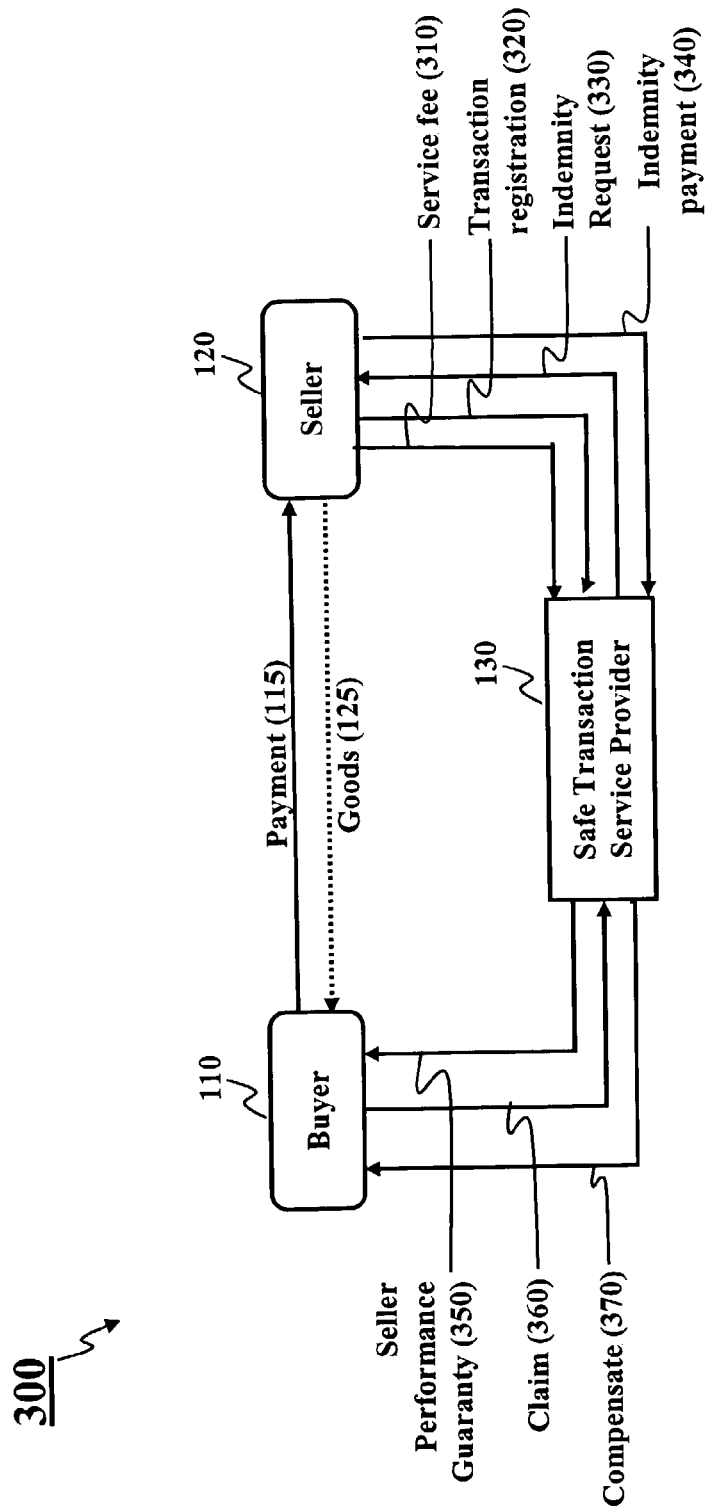
FIG. 3 describes a seller performance guaranty service which provides a transaction performance guaranty to a party involved in a transaction as a seller, according to an embodiment of the inventions.
Figure 4:
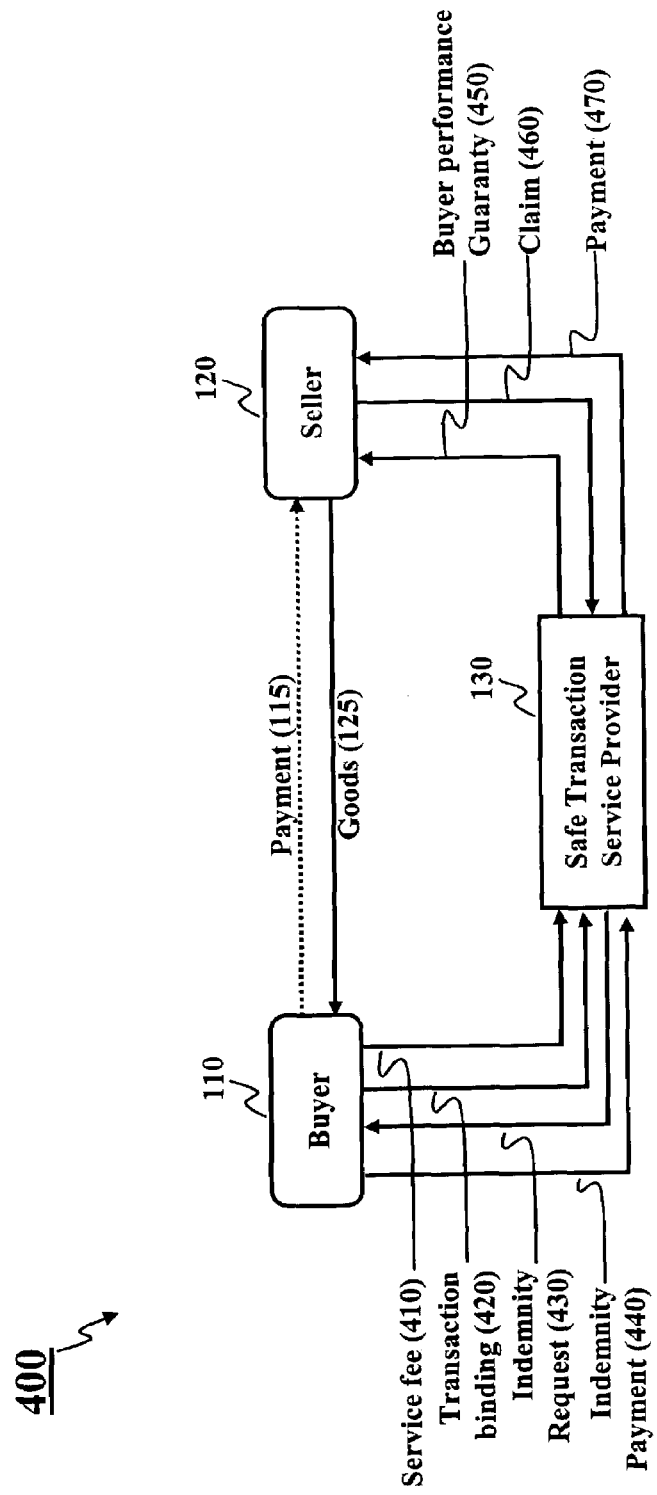
FIG. 4 describes a buyer performance guaranty service which provides a transaction performance guaranty to a party involved in a transaction as a buyer, according to an embodiment of the inventions.

A service subscriber can be either the seller 120 or the buyer 110. Similarly, a service beneficiary can be either the buyer 110 or the seller 120. FIGS. 3 and 4 describe a seller performance guaranty service model 300 and a buyer performance guaranty service model 400, respectively. In the FIG. 3 seller performance guaranty service model, the seller 120 subscribes to a seller transaction performance guaranty service from the safe transaction provider 130. The seller 120 pays the safe transaction service provider 130 a service fee (310) for a transaction performance guaranty service for a specified term.

During the service term, when the seller 120 initiates a transaction (e.g., intends to post an auction item on the Internet), the seller 120 registers the transaction (320) with the safe transaction service provider 130. The safe transaction service provider 130 may be notified of the transaction either before or after the sale item has been posted. According to the transaction performance guaranty agreement with the seller 120, the safe transaction service provider 130 may generate a seal (discussed later) that can be incorporated into a posting of the transaction to indicate that a transaction performance guaranty is bound to the posted transaction.

When a transaction agreement is reached (e.g., a winner is determined in an auction), the buyer is identified. At this point, the safe transaction service provider 130 considers the buyer 110 as the beneficiary of the seller's performance guaranty in this transaction and binds the seller's performance guaranty with respect to the transaction with buyer 110. The buyer 110 is then notified of the seller's performance guaranty (350).

Under a seller's transaction performance guaranty, when the seller 120 violates a term regarding the transaction (e.g., fails to deliver the goods 125 after the buyer 110 made the payment 115), the buyer 110 files a claim (360) with the safe transaction service provider 130. In other situations, the buyer 110 may file a claim merely based on a belief that the seller 120 has violated some agreed terms of the transaction. If the safe transaction service provider 130 determines that the seller 120 is at fault, it compensates (370) the buyer 110. Subsequently, the safe transaction service provider 130 sends an indemnity request (330) to the seller 120 according to the transaction performance guaranty service agreement. Finally, the seller 120 indemnifies the safe transaction service provider 130 (340) in compliance with the service agreement.

FIG. 4 describes a buyer performance guaranty service model 400, which provides a transaction performance guaranty to a party involved in a transaction as a buyer, according to an embodiment of the inventions. The buyer 110 subscribes to a buyer transaction performance guaranty service from the safe transaction provider 130. The buyer 110 pays the safe transaction service provider 130 a service fee (410) for a transaction performance guaranty service for a specified term.

During the service term, when the buyer 110 enters a negotiation related to a transaction (e.g., bid on an auction item posted on the Internet or solicit sellers of a particular product), the buyer 110 registers the transaction (transaction bonding) (420) with the safe transaction service provider 130. According to the transaction performance guaranty agreement with the buyer 110, the safe transaction service provider 130 may generate a seal representing the performance guaranty provided on behalf of the buyer 110. The seal may be shown to the seller 120 during negotiation or bidding process to indicate to the seller 120 that the buyer's performance is guaranteed. When the buyer 110 posts an advertisement to solicit sellers of particular goods, the seal may be incorporated into the advertisement to indicate a performance guaranty.

When the transaction is closed (e.g., the buyer 110 has selected a particular seller), the beneficiary of the buyer's performance guaranty is also determined (seller 120). The safe transaction service provider 130 then accordingly binds the buyer's performance guaranty (450), to the transaction with the buyer 110, issuing it to the seller 120 and notifying the seller 120 of the terms associated with the buyer's transaction performance guaranty. Alternatively, if the seller is known when the buyer enters the transaction negotiation process, the buyer's performance guaranty may also be bound at an earlier stage. For example, consider the case of a buyer 110 going to an auction site and bidding on a particular item. The seller is known from the start. In this case, the safe transaction service provider 130 may bind the performance guaranty to a transaction involving the parties at the time of the bidding.

Under a buyer's transaction performance guaranty, when the buyer 110 violates a term of the transaction (e.g., fails to make a payment 115 for the goods 125 received), the seller 110 files a claim (460) with the safe transaction service provider 130. In other situations, the seller 120 may file a claim based on a belief that the buyer 110 has violated some terms of the transaction. If the safe transaction service provider 130 determines that the buyer 110 is at fault, it makes a payment (470) to compensate the seller 120. Then, in compliance with the transaction performance guaranty service agreement with the buyer 110, the safe transaction service provider 130 sends an indemnity request (430) to the buyer 110 for an amount computed according to the compensation made to the seller 120. Finally, the buyer 110 indemnifies the safe transaction service provider 130 (440) according to the service agreement.

In the framework 100 depicted in FIG. 1, the safe transaction service provider 130 determines service subscribers according to their qualifications measured using different approaches. In framework 100, the safe transaction service provider 130 underwrites each applicant requesting different services. There may be a separate and distinct underwriter 140 involved in the process or the underwriter 140 may be part of the safe transaction service provider 130.

The underwriter 140 may communicate with different entities to gather relevant information in order to make a qualification decision about each service applicant. It may gather credit information from different credit agencies 150. It may also collect, either internally or externally, ratings of a merchant from various rating information sources 160. In some situations, the underwriter 140 may also examine different governmental archives 170 to identify court proceedings in which an applicant is a party indicating the applicant's alleged or convicted wrongful conduct. Furthermore, the underwriter 140 may also look up data from other public information sources 180 that may reflect the qualification of an applicant. For instance, there may be a public list posted on a web site that lists all merchants who have participated in fraud in prior commercial activities. The underwriter may be a person, a corporation that carries out the underwriting process either manually or automatically through a computer application program or semi-automatically.

The safe transaction service provider 130 may choose to offer its service only to applicants who have shown a certain level of trustworthiness based on information collected from different sources. This minimizes the potential risk borne by the safe transaction service provider 130. In an alternative embodiment, the safe transaction service provider 130 may also provide safe transaction related services on behalf of other business entities. For example, it may operate as an agency for an underwriter such as an insurance company. In addition, it may represent a plurality of independent business entities to offer, execute, and maintain safe transaction related services.

Figure 5:
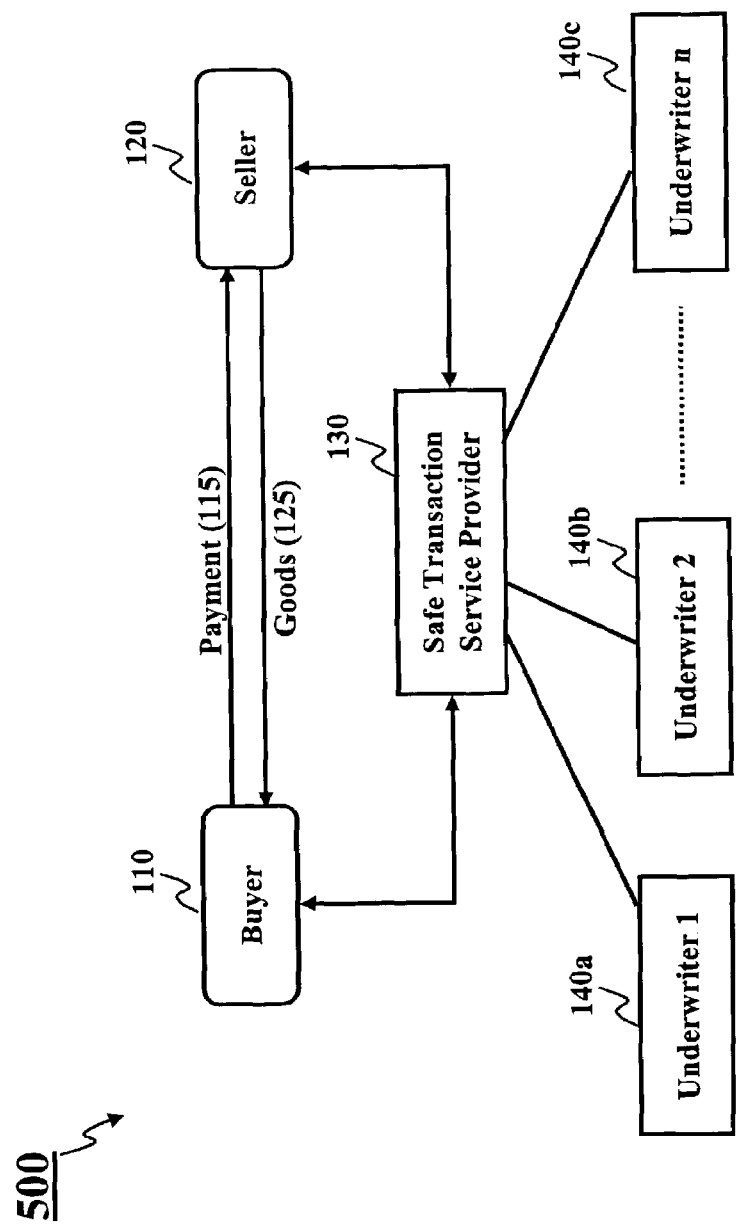
FIG. 5 depicts a framework in which a safe transaction service provider provides a transaction performance guaranty service on behalf of one or more independent underwriters, according to a different embodiment of the inventions.

FIG. 5 depicts another embodiment of the inventions—a framework 500 in which the safe transaction service provider 130 provides transaction performance guaranty services on behalf of one or more independent underwriters (e.g., an underwriter 1 140a, an underwriter 2 140b, . . . , an underwriter n 140c). The safe transaction service provider 130 may not be an underwriter. It may have contractual agreements with different underwriters to interface, on behalf of the underwriters, with different service subscribers (the buyer 110 or the seller 120) and service beneficiaries (the buyer 110 or the seller 120) to process matters related to services offered by the underwriters.

The safe transaction service provider 130 may choose to represent certain underwriters in order to provide a specific range of services. Depending on the service an applicant requests, the safe transaction service provider 130 may direct the applicant to an appropriate service offered by a particular underwriter. In this case, the particular underwriter, which offers the appropriate service, may underwrite the applicant separately according to its own evaluation criteria.

In an alternative embodiment, while the safe transaction service provider 130 represents independent underwriters in offering services, the safe transaction service provider 130 may also operate as an underwriter. In this case, the services it offers may differ from services offered by other underwriters. Alternatively, the safe transaction service provider 130 may provide a service that is jointly offered with other underwriters. Furthermore, the safe transaction service provider 130 may also have joint business ventures with other business entities.

Figure 6:
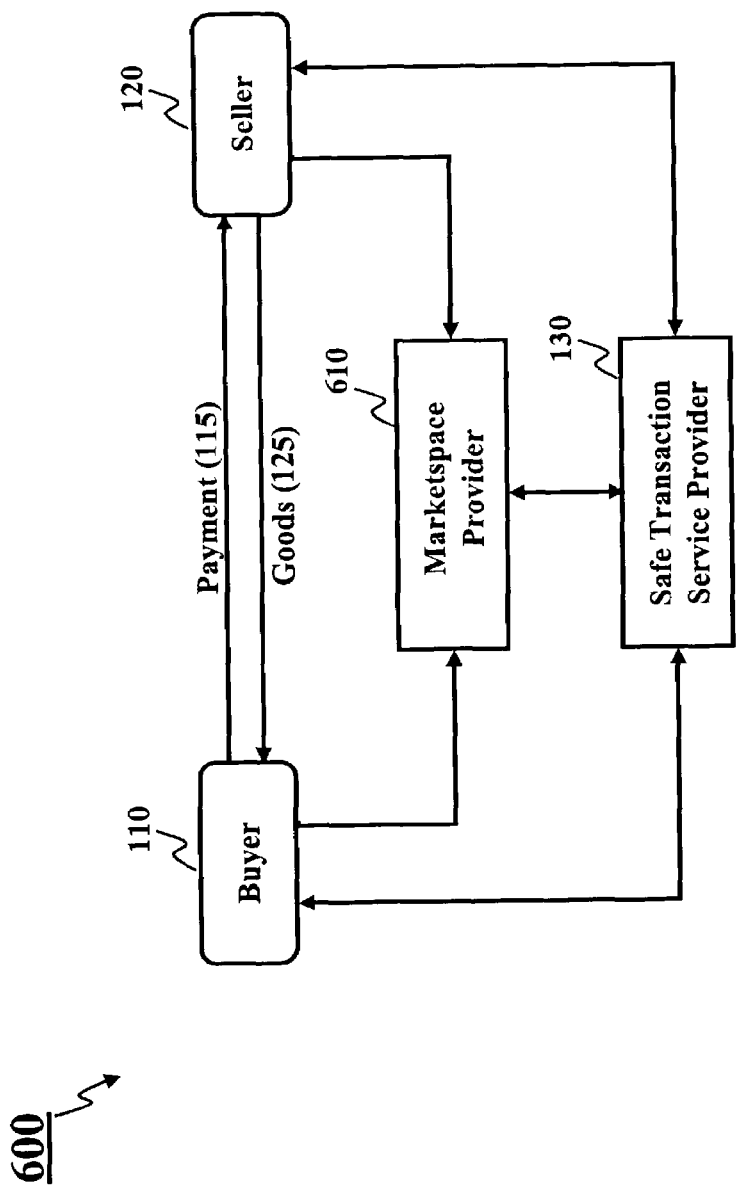
FIG. 6 depicts a framework in which a safe transaction service provider provides a transaction performance guaranty to a transaction posted in a marketspace provided by a marketspace provider, according to a different embodiment of the inventions.

FIG. 6 depicts another embodiment of the inventions—a framework 600 in which the safe transaction service provider 130 may interact with a marketspace provider 610 in order to effectively facilitate a transaction performance guaranty service to parties involved in transactions posted in a marketspace provided by the marketspace provider 610. In this embodiment, a transaction may be posted, negotiated, and carried out in a marketspace (not shown) run by the marketspace provider 610. Examples of such a marketspace provider may be eBay, uBid, Amazon Auctions, or Yahoo Auctions.

To participate in a transaction in a marketspace, the seller 120 may register and post the transaction with the marketspace provider 610 for a paid period. Similarly, interested buyers (including the buyer 110) may enter the marketspace to participate in different transactions. To effectively provide transaction performance guaranty services to participants of the transactions conducted in such a marketspace, the safe transaction service provider 130 may establish a business relationship with the marketspace provider 610. Through such a business relationship, the safe transaction service provider 130 may directly assist its service subscribers in a marketspace where the subscribers conduct their businesses. For example, if there is a business cooperation between the safe transaction service provider 130 and the marketspace provider 610, the safe transaction service provider 130 may incorporate a seal (indicating a performance guaranty) into a posted transaction at an appropriate location in the marketspace whenever a seller subscriber (who subscribes to a performance guaranty service) registers the transaction with the marketspace provider 610.

Similarly, when a transaction is closed, the marketspace provider 610 may immediately provide the safe transaction service provider 130 with various types of information related to the closing so that a performance guaranty associated with the transaction may be carried out promptly. For instance, eBay, as a marketspace provider, may inform the safe transaction service provider 130, at the closing of each auction, of the winner of the auction, the final closing price, and the contact information of the winner. With such information, the safe transaction service provider 130 may then promptly bind a seller's performance guaranty and send information related to the performance guaranty to the winner using the contact information provided by eBay.

In the framework 600, the service subscribers and beneficiaries continue interfacing with the safe transaction service provider 130. Direct communications are carried out to handle different business needs related to the transaction performance guaranty services. For example, the seller 120 may contact the safe transaction service provider 130 to obtain a service. The safe transaction service provider 130 may contact an auction winner regarding a performance guaranty service associated with the auction. In a different embodiment, services provided by (or through) the safe transaction service provider 130 may be offered directly through the marketspace provider 610.

Figure 7:
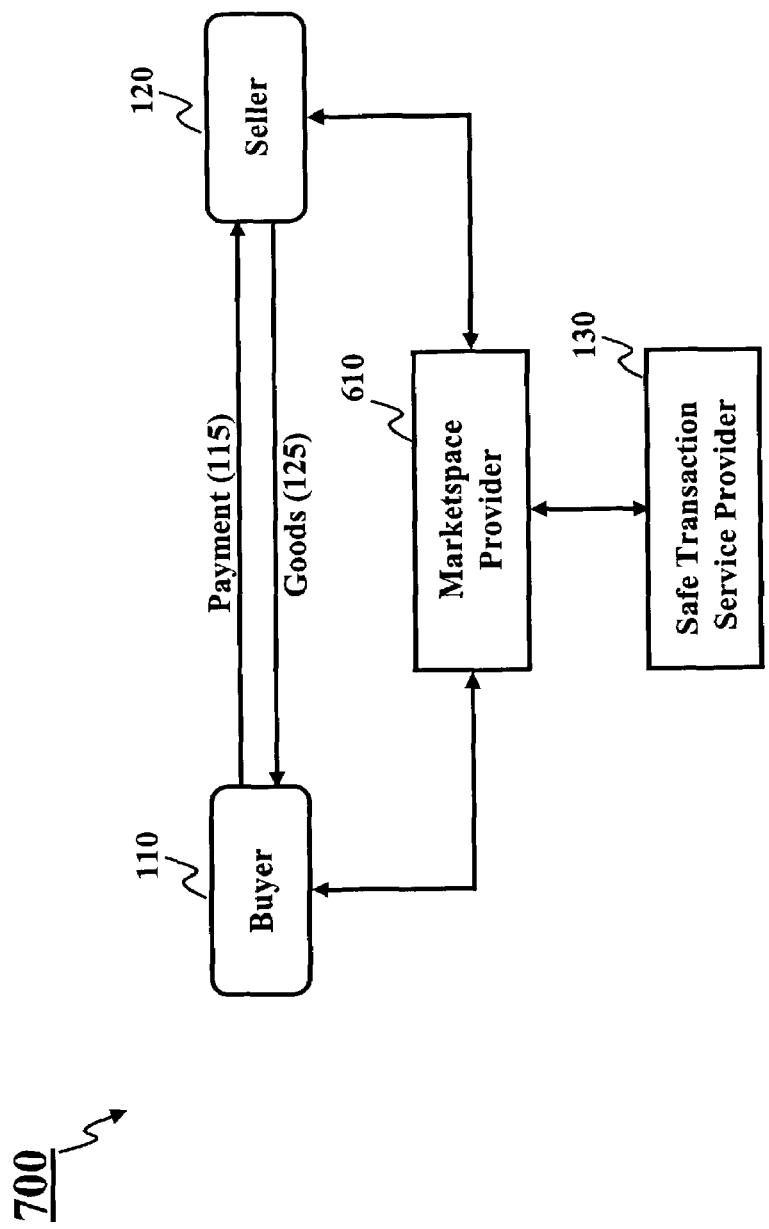
FIG. 7 depicts a framework in which a transaction performance guaranty bound to a transaction posted in a marketspace is provided by a marketspace provider, according to a different embodiment of the inventions.

FIG. 7 depicts another embodiment of the inventions—a framework 700 in which the marketspace provider 610 provides a transaction performance guaranty service. The marketspace provider 610 offers a marketspace for buyers and sellers to conduct transactions (e.g., eBay). The marketspace provider 610 also provides transaction performance guaranty services to such participants. The marketspace provider 610 may offer such performance guaranty services on behalf of the independent safe transaction service provider 130 or jointly with the safe transaction service provider 130, depending on the agreement between the marketspace provider 610 and the safe transaction service provider 130.

The marketspace provider 610 may offer its own performance guaranty services. In this case, the safe transaction service provider 130 may be part of the marketspace provider 610 and supports its operations in the aspects of providing services that are peripheral to providing marketspaces. As an alternative, the marketspace provider 610 may offer transaction performance guaranty services from different providers, including its own services, services from the safe transaction service provider 130, and services from other business entities.

Various embodiments discussed with reference to FIGS. 1-5 and combinations thereof are all applicable to the framework 600 and the framework 700. In a particular business practice, a specific combination may be adopted and implemented according to the needs and arrangements called for in an application environment. The discussion below with reference to FIGS. 8-18 focuses on different aspects of the safe transaction service provider 130. Particularly, FIGS. 8-11 depict the aspect of exemplary system construction of different parts of the safe transaction service provider 130. FIGS. 12-18 show flows of different exemplary processes. The arrangements and processes shown in the figures and described herein are exemplary. One skilled in the art to which our claimed inventions pertain will appreciate that other constructions and flows may also be employed to achieve the same or similar functionalities and the equivalents thereof.

Figure 8:
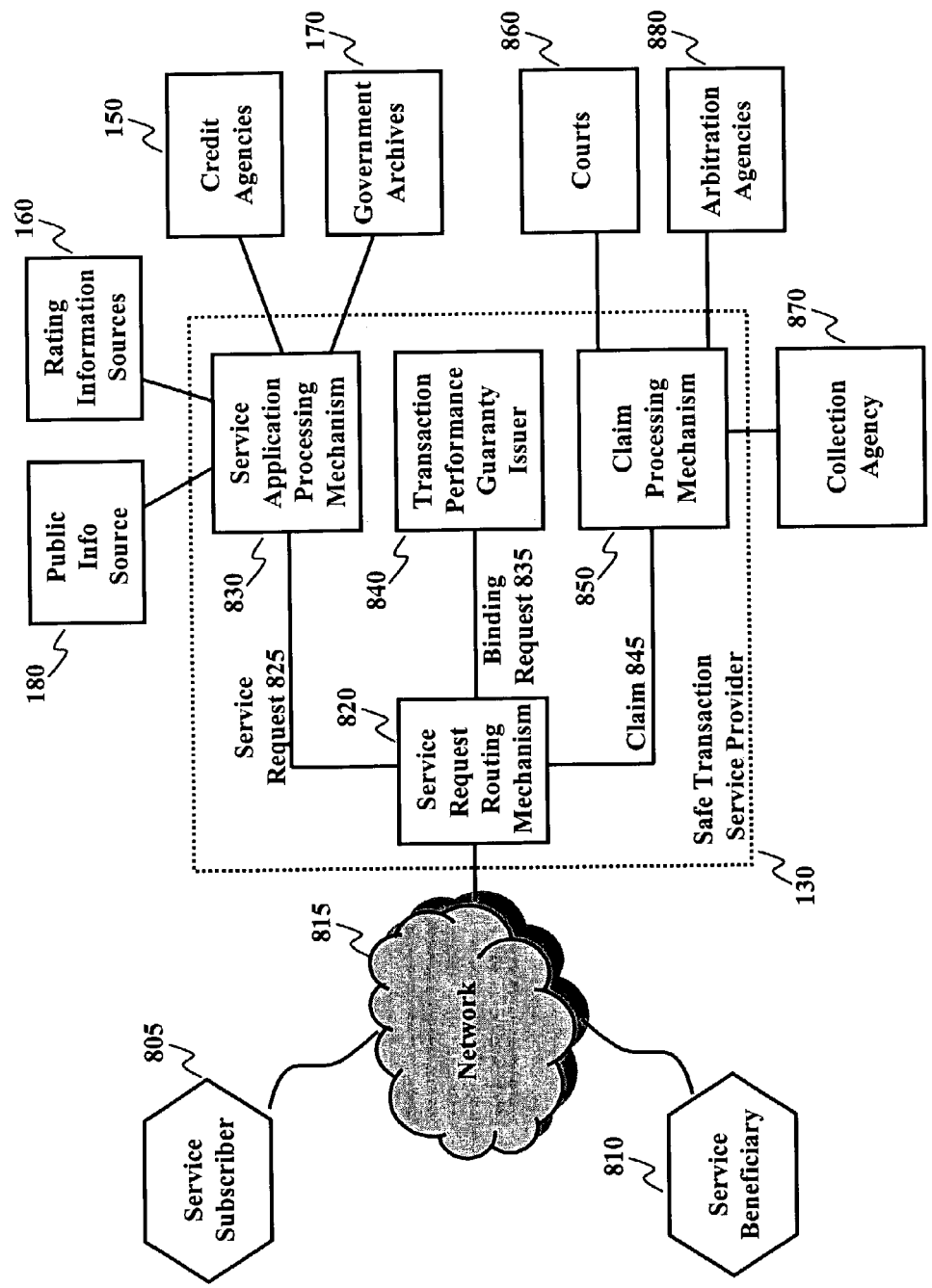
FIG. 8 depicts an exemplary internal structure of a safe transaction service provider and its relations with other entities, according to an embodiment of the inventions.

FIG. 8 depicts an exemplary internal structure of the safe transaction service provider 130 and its relations with other entities, according to an embodiment of the inventions. The safe transaction service provider 130 includes a service request routing mechanism 820, a service application processing mechanism 830, a transaction performance guaranty issuer 840, and a claim processing mechanism 850. The service request routing mechanism 820 is responsible for routing a received service request to an appropriate mechanism. For example, when a received request is to obtain a service (i.e., a service request 825), the service request routing mechanism 820 may direct the request to the service application processing mechanism 830. Details related to the service application processing mechanism 830 are discussed with reference to FIG. 9. When a request is from a service subscriber to request the safe transaction service provider 130 to bind a performance guaranty to a particular transaction (i.e., a binding request 835), the service request routing mechanism 820 may route the request to the transaction performance guaranty issuer 840. Details related to the transaction performance guaranty issuer 840 are discussed with reference to FIG. 10. Similarly, when a claim 845 is received, the claim is forwarded to the claim processing mechanism 850. Details related to the claim processing mechanism 850 are discussed with reference to FIG. 11.

The service request routing mechanism 820 may also serve as an interface between different mechanisms and the outside world. For instance, it may interface with a service subscriber 805 to request application information required by the service application processing mechanism 830. When the service subscriber 805 requests the safe transaction service provider 130 to bind a particular transaction, the service request routing mechanism 820 may also collect from the subscriber information related to the transaction such as the location posted, the seal to be used, etc. Furthermore, when a service beneficiary 810 sends a claim, the service request routing mechanism 820 may also serve as an intermediate interface to assist the claim processing mechanism 850 to gather important evidence related to claimed default.

The communications between the safe transaction service provider 130 and the outside world may be conducted via a network 815. The network 815 is a generic one, which may represent the Internet, a proprietary network, a virtual private network, a telephone network, a cable network, a wireless network, a local area network (LAN), a wide area network (WAN), or a combination thereof. Different parts of the safe transaction service provider 130 may interact with different outside entities. Such interaction may also go through a network (not shown).

As described with reference to FIG. 1, the safe transaction service provider 130 may gather information from different sources (e.g., the credit agencies 150, the rating information sources 160, the governmental archives 170, and the public information sources 180) in order to underwrite a service applicant. The service application processing mechanism 830 is responsible for approving a service application and it may communicate with these information sources to gather useful information. The claim processing mechanism 850 is responsible for resolving claims received. When necessary, the claim processing mechanism 850 may interact with different outside entities to reach a resolution. Such outside entities involved in claim resolution include, but are not limited to, arbitration agencies 880, collection agencies 870, or courts 860.

Figure 9:
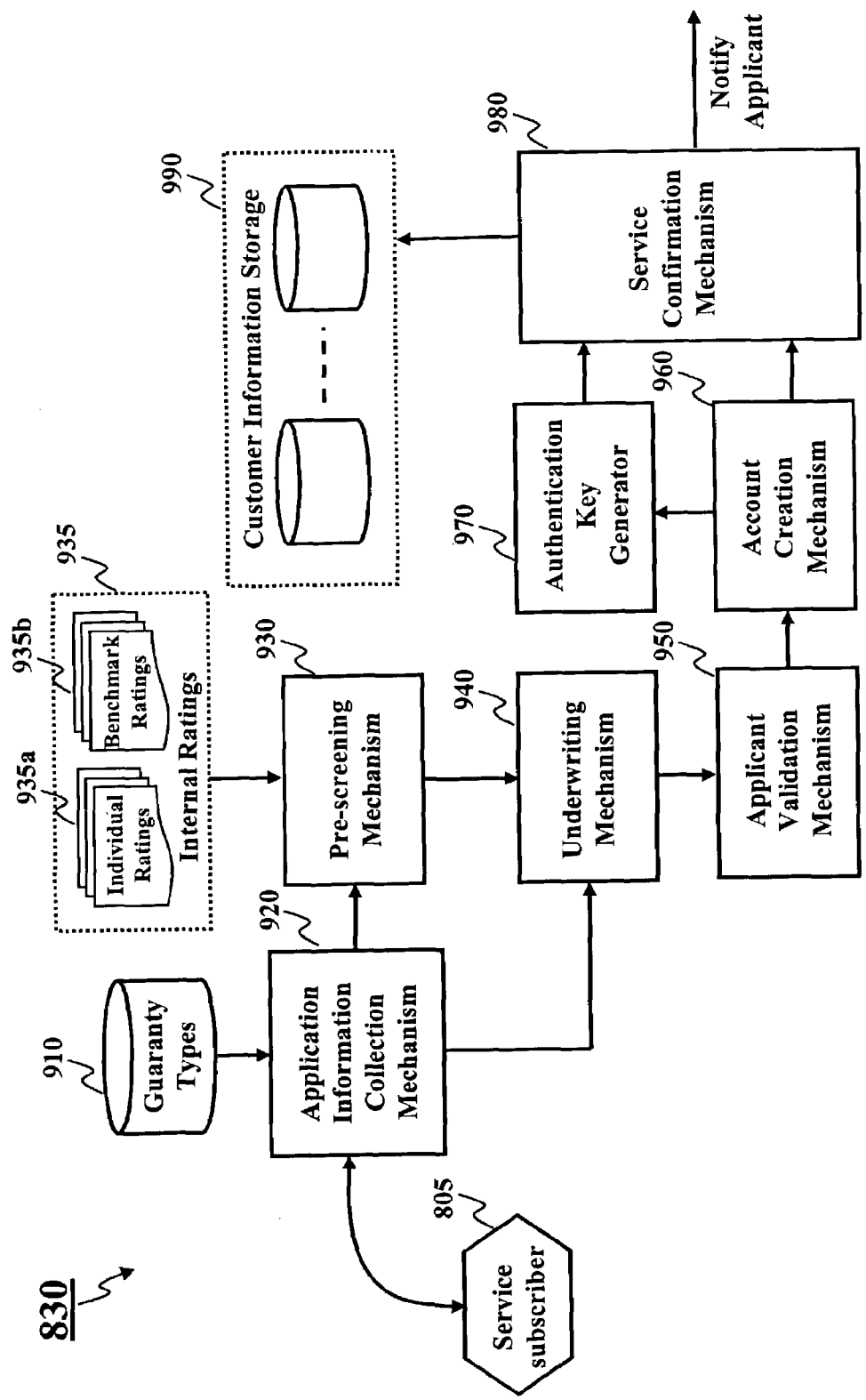
FIG. 9 shows an exemplary internal structure of a service application processing mechanism, according to an embodiment of the inventions.

FIG. 9 shows an exemplary internal structure of the service application processing mechanism 830, according to an embodiment of the inventions. The service application mechanism 830 includes an application information collection mechanism 920, a pre-screening mechanism 930, an underwriting mechanism 940, an applicant validation mechanism 950, an account creation mechanism 960, an authentication key generator 970, and a service confirmation mechanism 980. The service application processing mechanism 830 may also optionally include a storage 910 that stores information related to different forms of performance guaranty. A few exemplary forms in which a performance guaranty may be provided are illustrated in FIG. 2.

The application information collection mechanism 920 may interact with a service applicant (or subscriber) 805 to gather information in order to approve the application. For instance, the application information collection mechanism 920 may ask the applicant to select a form in which the requested performance guaranty is preferably provided (e.g., the applicant may select a surety bond). Other information to be collected may include, but is not limited to, the preferred term of the service (e.g., 6 month term or one year term), the marketspace(s) where the applicant prefers to post transactions, etc. In addition, information related to the applicant may also be collected such as their social security number. Such information may be used in collecting other information such as a credit score in order to evaluate the applicant. The application information collection mechanism 920 may interact with the applicant directly or through the service routing mechanism 820.

Information gathered by the application information collection mechanism 920 may be forwarded to different parts of the application processing mechanism so that different evaluations may be performed. The pre-screening mechanism 930 may be utilized for conducting a coarse level of screening. Such pre-screening may utilize information from different sources (as described with reference to FIG. 8). For example, the pre-screening mechanism 920 may use internal ratings 935 for screening purposes. The internal ratings may be divided into individual ratings 935a and benchmark ratings 935b. The individual ratings 935a may be computed over time, based on individual performances. The benchmark ratings 935b may be computed over time, based on the aggregated performance of a group of individuals. For example, a benchmark rating may be computed across a population of business people or businesses that specialize in selling furniture.

The individual ratings 935a and the benchmark ratings 935b may be used separately or collectively by the pre-screening mechanism 930. For instance, an individual rating may provide an absolute score reflecting the performance of the individual in comparison with, for example, the entire population. An individual rating may also be evaluated in light of a benchmark rating appropriate for the individual. For instance, if an applicant is a merchant who specializes in selling used cars on the Internet, his individual rating may be evaluated by comparing his individual rating with the benchmark rating derived from the population of a group of individuals who also specialize in selling used cars over the Internet. Further details related to pre-screening are described with reference to FIGS. 13 and 14.

The underwriting mechanism 940 may be responsible for underwriting an applicant. The underwriting mechanism 940 may initiate an underwriting process only when the pre-screening yields a positive outcome. That is, if the pre-screening mechanism 930 determines that an applicant is not qualified, it may inform the underwriting mechanism 940 not to proceed with the underwriting operation.

If the underwriting mechanism 940 successfully underwrites an applicant, it may further trigger the applicant validation mechanism 950 to further validate the applicant. The validation process may include verifying the employment, the name, the address, and other relevant information associated with the applicant. If the validation mechanism 950 fails to verify important information (e.g., home address), it may invalidate the applicant.

When the applicant is validated, the account creation mechanism 960 is invoked to create an account of the requested service for the applicant. In addition, the authentication key generator 970 is invoked to generate an authentication key to be used to authenticate anyone who claims to have the requested service. The created account and the generated authentication key are forwarded to the service confirmation mechanism 980, which may store such information identifying the service associated with the applicant (or subscriber) in a customer information storage 990 and send a notification to the applicant with information related to the approved service. An exemplary process flow of the service application processing is shown with reference to FIG. 13.

Figure 10A:
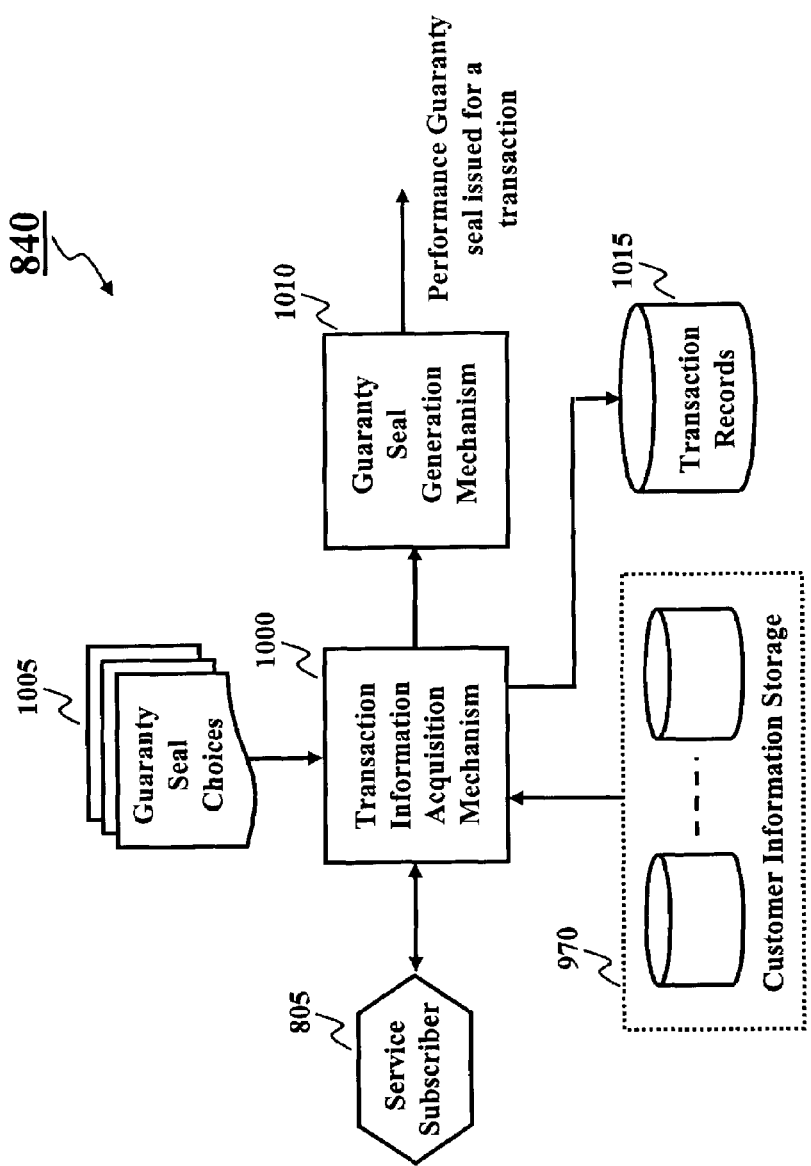
FIG. 10(a) shows an exemplary internal structure of a transaction performance guaranty issuer, according to an embodiment of the inventions.
Figure 10B:
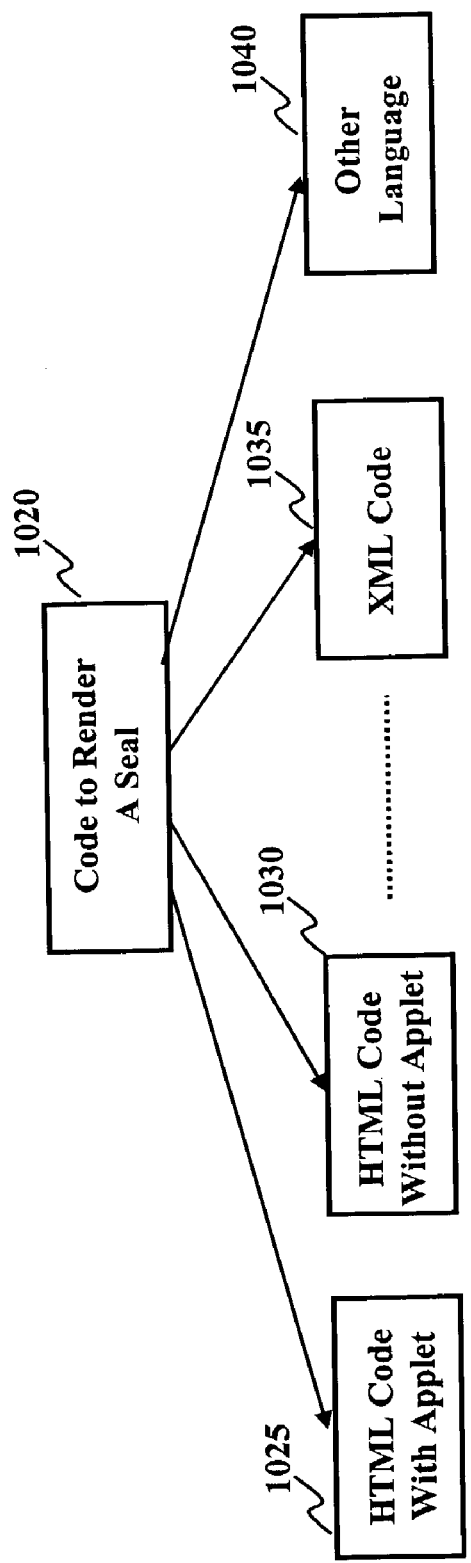
FIG. 10(b) describes different exemplary forms in which a seal can be generated, according to an embodiment of the inventions.
Figure 10C:
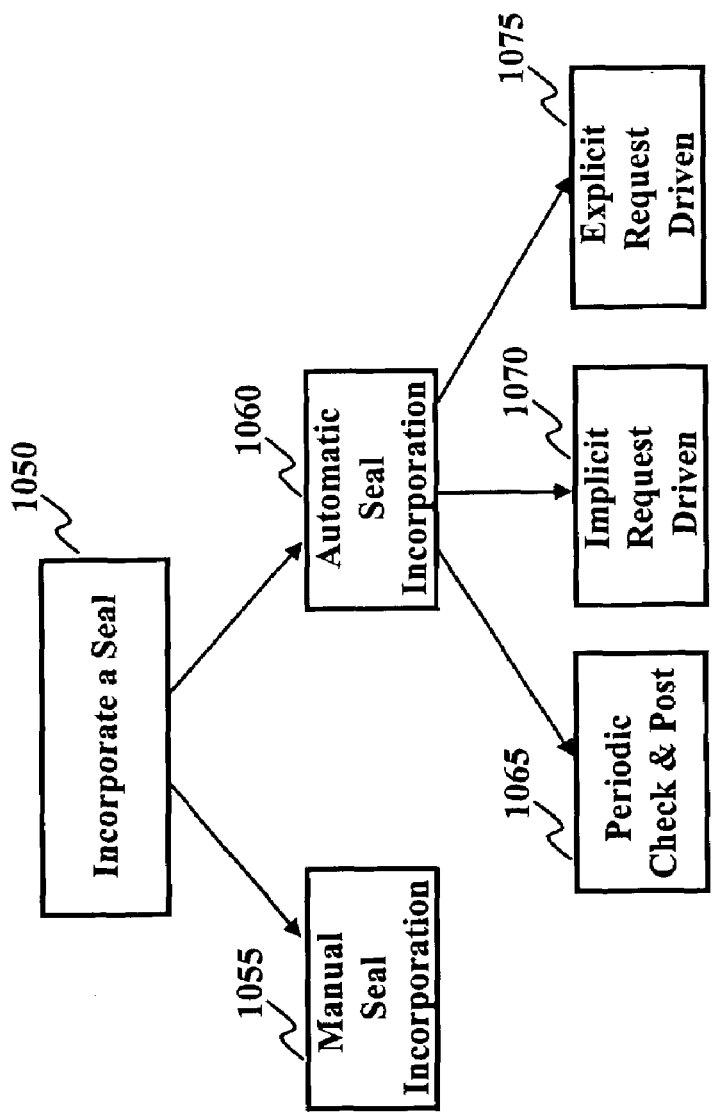
FIG. 10(c) describes exemplary means to incorporate a seal into a posting of a transaction, according to an embodiment of the inventions.

FIG. 10(*a*) shows an exemplary internal structure of the transaction performance guaranty issuer 840, according to an embodiment of the inventions. A transaction information acquisition mechanism 1000 may be responsible for gathering transaction related information from a service subscriber 805 who requests the safe transaction service provider 130 to bind a transaction performance guaranty to a specific transaction. This may include asking the service subscriber 805 to select, from a plurality of available choices of guaranty seals (1005), a preferred seal to be used to bind this transaction.

The transaction information acquisition mechanism 1000 may also gather information from the customer information storage 970 that is related to the service subscriber 805. For instance, the service subscriber 805 may have specified a marketspace where all his transactions are to be posted. Such information may be useful in determining how a seal should be generated. For example, a certain marketspace may allow only HTML pages for posting a transaction. On the other hand, a different marketspace may require XML.

The transaction information acquisition mechanism 1000 may further register the transaction to be bound in a storage 1015 that stores all the transaction records. The registration is performed using the information collected. Some collected information is forwarded for further processing. For example, the subscriber's choice of seal is forwarded to a guaranty seal generation mechanism 1010 so that a desired seal can be generated. In addition, information related to the required platform of a marketspace where the seal is to be posted may also be forwarded to the guaranty seal generation mechanism 1010.

A seal may be in a graphical form. To render a seal in its graphical form, the guaranty seal generation mechanism 1010 may produce code that can be use to render a graphical symbol. Such code may be generated in different forms. FIG. 10(*b*) describes different exemplary forms in which code corresponding to a seal can be generated, according to an embodiment of the inventions. Code generated to render a seal 1020 may be generated as HTML code (1025 and 1030), XML code (1035), or code in other languages (1040) capable of rendering a graphical symbol. In general, code in any language that is capable of achieving the task suffices.

The generated HTML code (or XML code) may also be incorporate with an applet (e.g., a Java applet) that may be designed to perform certain tasks related to the bound transaction or transaction performance guaranty service after a seller and a buyer enter into the transaction. For example, such an applet may extract information related to the underlying transaction automatically from a marketspace. Such information may include, but is not limited to, the date that the transaction negotiation/bidding is closed, the number of days between the posting and the closing, the final price agreed, or other terms consented by both parties. The applet may send extracted information back to the safe transaction service provider 130 to record such data for future use.

Such generated code may be incorporated into a posting of the registered transaction to render the seal. There may be different approaches that may be employed to incorporate the seal into a posting. FIG. 10(*c*) describes different exemplary means for incorporating a seal 1050. It may be incorporated manually (1055) or automatically (1060). When a manual approach is adopted, the generated code is provided to the subscriber and can then be pasted into the code used to post the registered transaction.

When an automatic approach is adopted, different automation modes may be further employed. To perform automatic incorporation, the safe transaction service provider 130 may be required to have direct access to the marketspace where the registered transaction is posted. In this case, the incorporation may be performed in a periodic check and post mode (1065), an implicit request driven mode (1070), or an explicit request driven mode (1075). In the periodic check and post mode 1065, the safe transaction service provider 130 may periodically check, in the specified marketspace(s), whether a new transaction has been posted under each subscriber. The safe transaction service provider 130 incorporates a seal (e.g., pre-selected by the subscriber) to a new transaction whenever it determines that a new transaction has been posted since the last time. In this mode, the interval for the check may be set according to specific needs. For example, it can be every minute, every hour, every day, or every other day. The interval may also be set with respect to each subscriber. For a subscriber who posts transactions frequently, the interval may be shorter; for a subscriber who does not post transactions often, the interval maybe set longer.

In the implicit request driven mode 1070, whenever a new transaction is posted, a subscriber may inform the safe transaction service provider 130 that there is a new transaction. This may be done without indicating which posted transaction is new (implicit). The safe transaction service provider 130 may keep track of all the transactions posted so far under each subscriber. Whenever such an indication is received, the safe transaction service provider 130 may simply check against its record to determine which transaction is newly posted and incorporate the seal accordingly.

In the explicit request driven mode 1075, a subscriber may explicitly inform the safe transaction service provider 130 of each of the newly posted transactions for which a seal is to be incorporated.

Figure 11:
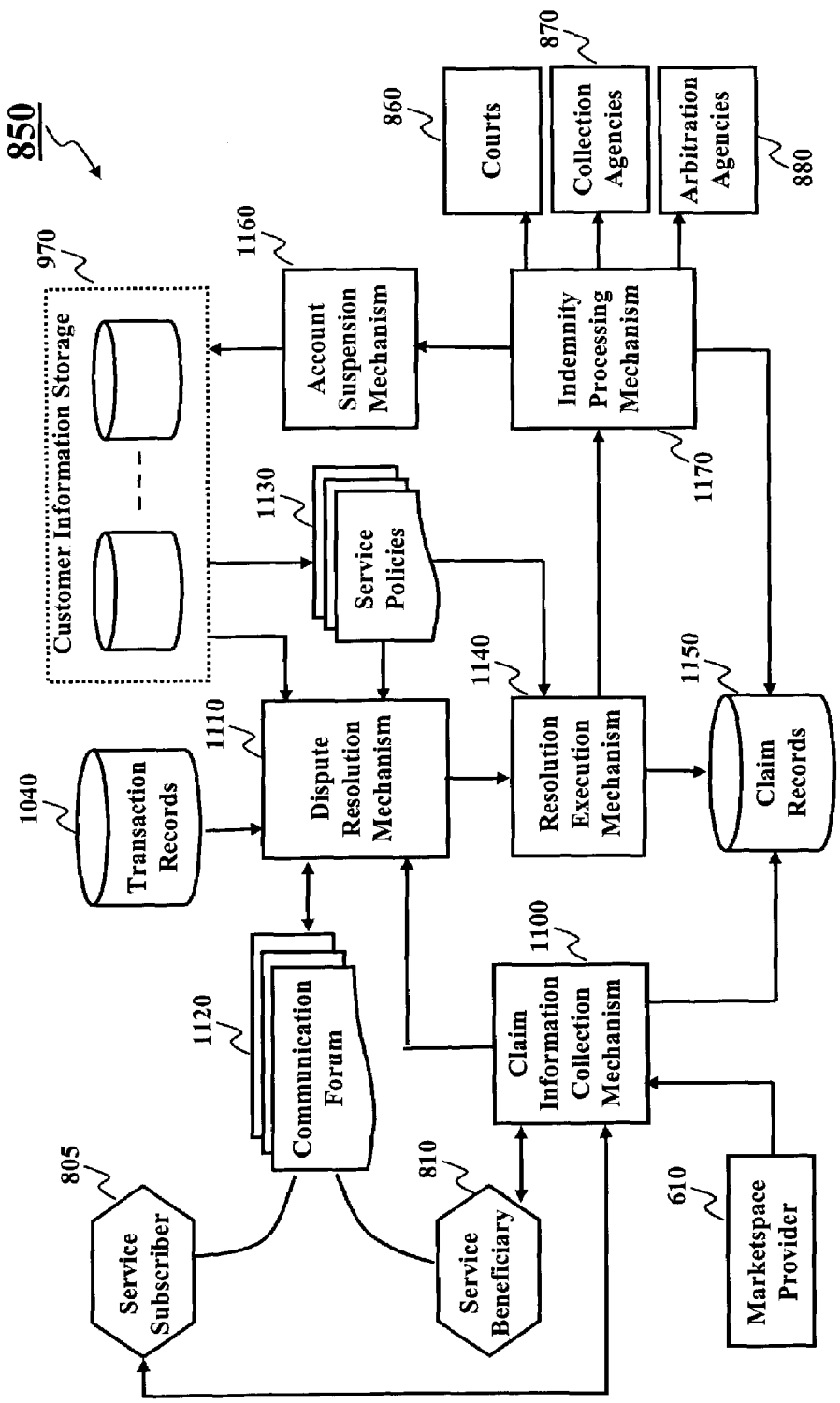
FIG. 11 depicts an exemplary internal structure of a claim processing mechanism, according to an embodiment of the inventions.

FIG. 11 depicts an exemplary internal structure of the claim processing mechanism 850, according to an embodiment of the inventions. The claim processing mechanism 850 comprises a claim information collection mechanism 1100, a dispute resolution mechanism 1110, a resolution execution mechanism 1140, an indemnity processing mechanism 1170, and an account suspension mechanism 1160. The claim information collection mechanism 1100 may be responsible for gathering information related to a claim received from a service beneficiary 810. Such information may be acquired from different parties. For example, from the service beneficiary 810, the claim information collection mechanism may acquire information about the underlying transaction, agreed terms of the transaction, and the violation of a term based on which the claim is filed.

The claim information collection mechanism 1100 may also acquire relevant information from a marketspace provider 610 such as the dates the transaction is closed at the marketspace where the underlying transaction is posted. Relevant information may include the final terms at the closing of the transaction such as the final price for the goods recorded and some logged activities of the seller or the buyer before or after the closing.

The claim information collection mechanism 1100 may then forward the claim and collected information to the dispute resolution mechanism 1110 which may be responsible for determining a resolution regarding the claim. There is an optional communication forum 1120, which may be used by the involved parties to communicate on issues raised in order to resolving the claim. For each claim, a separate forum may be set up with access rights to a limited group of parties, which may include the parties involved in the transaction, the personnel assigned to handle the claim, and any other party that may have insight into the issues involved. The forum set up for a particular claim may be implemented as a group bulletin board or a group mailbox.

Whenever the dispute resolution mechanism 1110 receives a claim and its relevant information, it may set up a corresponding communication forum designated to the claim. Initially collected data may be placed in the forum so that all parties involved can see what is claimed and on what ground. This may also include factual data collected from the marketspace where the transaction in dispute is posted. The dispute resolution mechanism 1110 may continuously monitor any incoming information placed in the communication forum. Evidence is collected in a continuous fashion and used in reaching a resolution.

The dispute resolution mechanism 1110 may also gather information from other sources. It may use information stored in the transaction records to, for example, verify some information supplied in the claim regarding the transaction. It may also check with service policies 1130 to determine, for example, the coverage of the subscriber involved in the transaction. Each subscriber may have a different coverage.

The dispute resolution mechanism 1110 may be manually operated, automatically operated, or semi-automatically operated. When the dispute resolution mechanism reaches a resolution, it informs the resolution execution mechanism 1140, which is responsible for carrying out a claim resolution. If the resolution is in favor of the claimant, the resolution execution mechanism 1140 may generate a payment in an amount consistent with the resolution and send the payment to the claimant. The resolution execution mechanism 1140 may then invoke the indemnity processing mechanism 1170 to initiate a proceeding to seek indemnity from the subscriber involved. If the resolution is in favor of the subscriber (e.g., it is determined that no term of the transaction is violated), the resolution execution mechanism 1140 may clear the claim by informing the claimant. The claim records stored in 1150 may then be updated.

When a claim leads to an indemnity proceeding, the indemnity processing mechanism 1170 is activated. It may invoke the account suspension mechanism 1160 to suspend the account for the subscriber involved and to record the suspension in the customer information storage 970. To seek indemnity from the subscriber, the indemnity processing mechanism 1170 may adopt one or more approaches. It may rely on an arbitration process conducted through arbitration agencies 880. It may also seek indemnity through collection effort. Such collection may be performed internally, externally (through collection agencies 870), or a combination of both (e.g., first conduct an internal collection for a predetermined period and then delegate the effort to an outside agency). The indemnity processing mechanism 1170 may also seek indemnity by bringing a legal action against the subscriber in a court (860). Different methods of seeking indemnity may also be combined, applying different methods at different stages of the effort.

Figure 12:
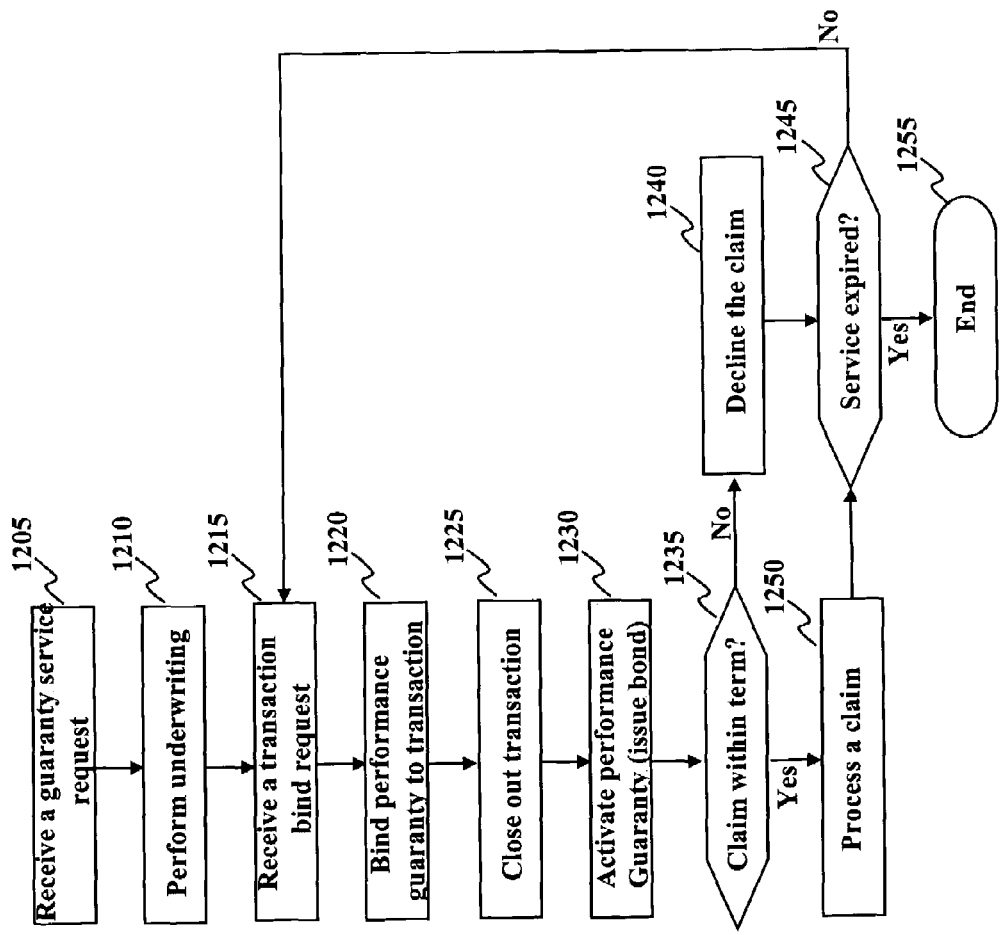
FIG. 12 is a flowchart of an exemplary process, in which a safe transaction service provider provides a transaction performance guaranty to a transaction involving a party who obtains the transaction performance guaranty service through an underwriting process, according to an embodiment of the inventions.

FIGS. 12-18 describe exemplary process flows corresponding to different aspects of the safe transaction service. FIG. 12 is a flowchart of an exemplary process, in which a transaction performance guaranty service is used to ensure a party's performance in a transaction, according to an embodiment of the inventions. A service request for a transaction performance guaranty is first received, at 1205, from an applicant. To approve the requested service, the safe transaction service provider 130 (or an independent underwriter) underwrites, at 1210, the applicant. Details related to the process of underwriting the applicant are discussed with reference to FIG. 13. An applicant who is successfully approved obtains the requested transaction performance guaranty service and becomes a service subscriber. The service may be provided according to a service agreement with one or more terms.

Under the transaction performance guaranty service, for each transaction, the subscriber sends a transaction binding request to the service provider 130 to bind a transaction performance guaranty to the transaction. When the request is received, at 1215, the safe transaction service provider 130 registers, at 1220, the performance guaranty service to the registered transaction. This may include generating a seal to be incorporated into the posting of the transaction.

After the posted transaction is closed, at 1225, the performance Guaranty is bound to the transaction at 1230. Information related to the guaranty is sent to the beneficiary of the guaranty. If a claim is received from the beneficiary within the term of the guaranty, determined at 1235, the claim is processed at 1250. Otherwise, the claim is declined at 1240. Before the service term expires, determined at 1245, process returns to 1215 for the next transaction. Otherwise, the process ends at act 1255.

Figure 13:
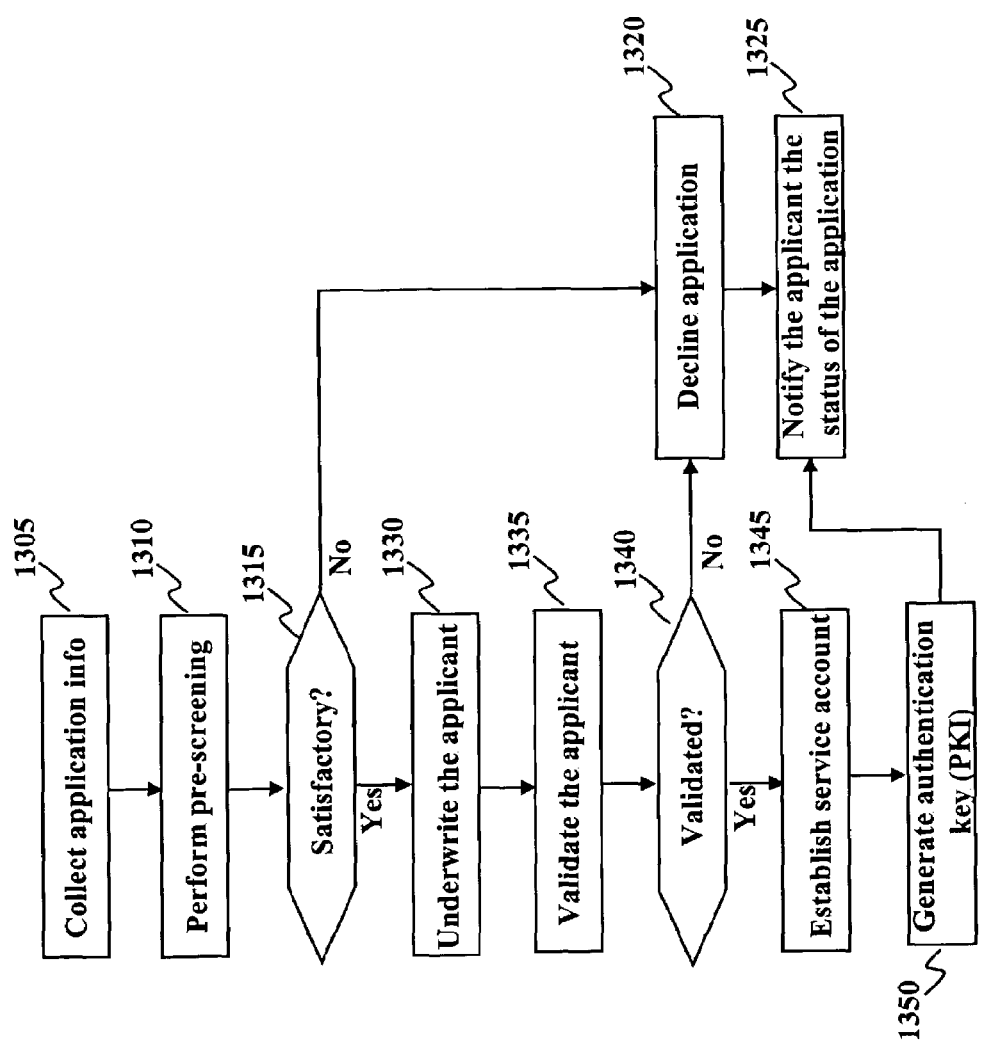
FIG. 13 is a flowchart of an exemplary process, in which a safe transaction service application is processed, according to an embodiment of the inventions.

FIG. 13 is a flowchart of an exemplary process, in which a service request is processed, according to an embodiment of the inventions. Information related to the applicant is first collected at 1305. Pre-screening is performed at 1310. The pre-screening may involve more specific operations.

Figure 14:
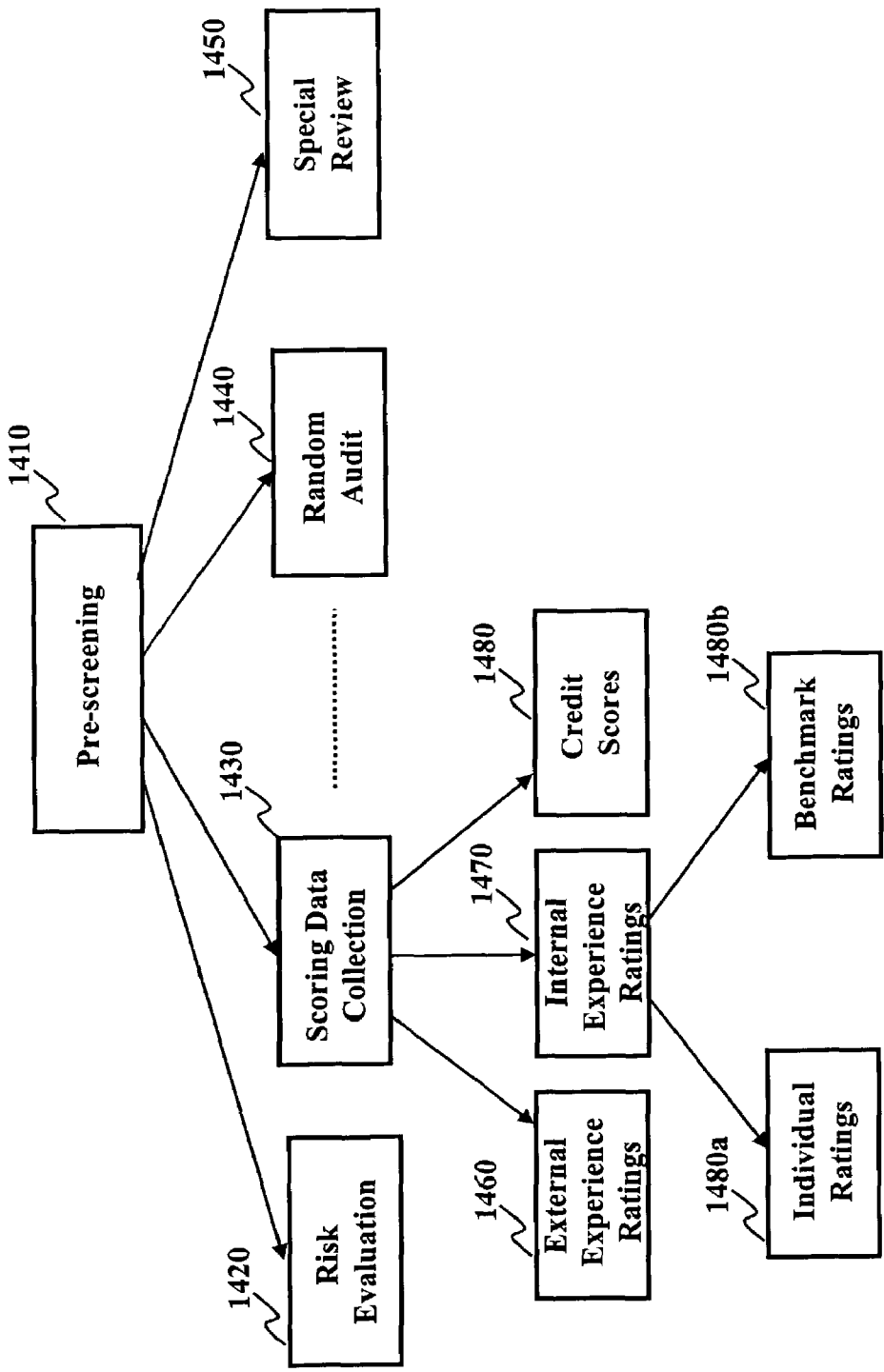
FIG. 14 illustrates exemplary means used to perform a pre-screening on an applicant for transaction performance guaranty service and exemplary types of information used to carry out the pre-screening, according to an embodiment of the inventions.

FIG. 14 illustrates exemplary means used to perform pre-screening on the applicant as well as exemplary types of information used during pre-screening, according to an embodiment of the inventions. Pre-screening (1410) may be performed by carrying out a risk evaluation (1420), by collecting various scoring data (1430), through a random audit process (1440), or through a special review session (1450). Scoring data collected may be used for risk analysis, during the random audit or review session. As discussed earlier, the scoring data may include credit scores (1480), external experience ratings 1460, or internal experience ratings 1470. Experience ratings may further include individual ratings (1480*a*) or benchmarking ratings (1480*b*).

If pre-screening is unsatisfactory, determined at 1315, the application is declined at 1320. The applicant is notified, at 1325, of the application status. If pre-screening is satisfactory, the safe transaction service provider 130 (or an independent underwriter or a marketspace provider) underwrites, at 1330, the applicant. If it is successful, the safe transaction service provider 130 validates, at 1335, the applicant.

When the applicant is not validated, determined at 1340, the application is declined at 1320 and the applicant is notified at 1325. If the applicant is validated, a service account is established at 1345 and an authentication key is generated at 1350. The applicant is then notified, at 1325, of the application status with account information and the authentication key provided.

Figure 15:
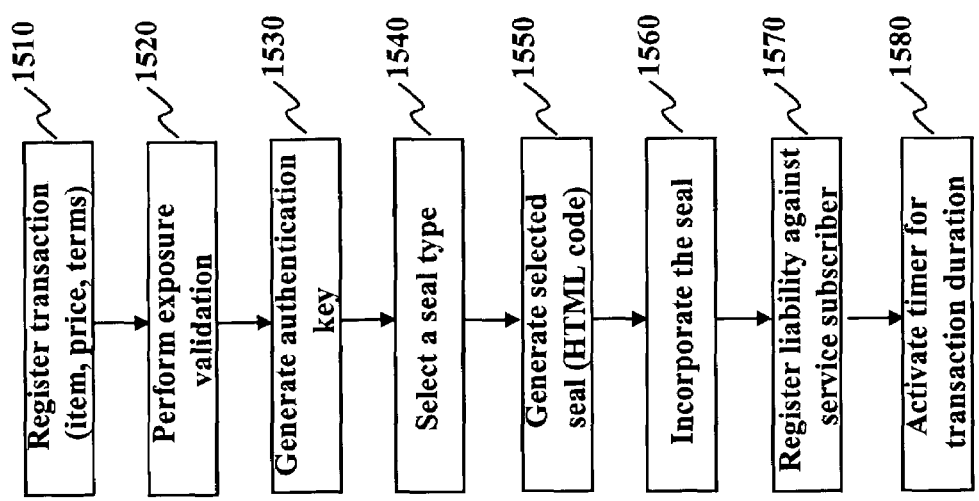
FIG. 15 is a flowchart of an exemplary process, in which a safe transaction service provider binds a transaction performance guaranty to a transaction, according to an embodiment of the inventions.

FIG. 15 is a flowchart of an exemplary process, in which the safe transaction service provider 130 binds a transaction performance guaranty to a transaction associated with a subscriber. The transaction is first registered at 1510. This may include entering information related to the transaction such as the price listed. Based on the information registered, the safe transaction service provider 130 performs an exposure validation at 1520. This may include examining the total amount of liability currently registered against the subscriber. If the registered liability exceeds a certain limit, the safe transaction service provider 130 may opt to deny the requested binding (not shown). The limit may be determined according to different criteria. For example, it could be a dollar amount. It may also be computed according to, for instance, the internal rating of the subscriber.

After the exposure validation, the safe transaction service provider 130 generates an authentication key at 1530 associated with this particular transaction. This is a second tier key. The first tier corresponds to an authentication key generated at the time the service is approved. The authentication key at the first tier (e.g., a private key) is connected only to the service and not to any specific transaction covered under the service. An authentication key at the second tier (e.g., a public key) is generated for a subscriber to identify each individual transaction. It is connected to a corresponding transaction under a specific subscriber. In order for the safe transaction service provider 130 to be able to distinguish individual transactions under each subscriber, two counterpart keys for each transaction may be generated. One is for the subscriber and the other is for the safe transaction service provider 130.

To bind a performance guaranty to a transaction, a seal is generated. A subscriber may be allowed to select, at 1540, a seal type to be generated before the seal is generated at 1550. The generated seal is then incorporated, at 1560, into the posting of the transaction to accomplish the binding. After the binding, the safe transaction service provider 130 registers, at 1570, the liability associated with the bound transaction against the subscriber. The amount registered may be determined according to the listed price of the goods involved in the registered transaction. A timer may then be activated, at 1580, to measure the duration of the transaction before it closes.

Figure 16:
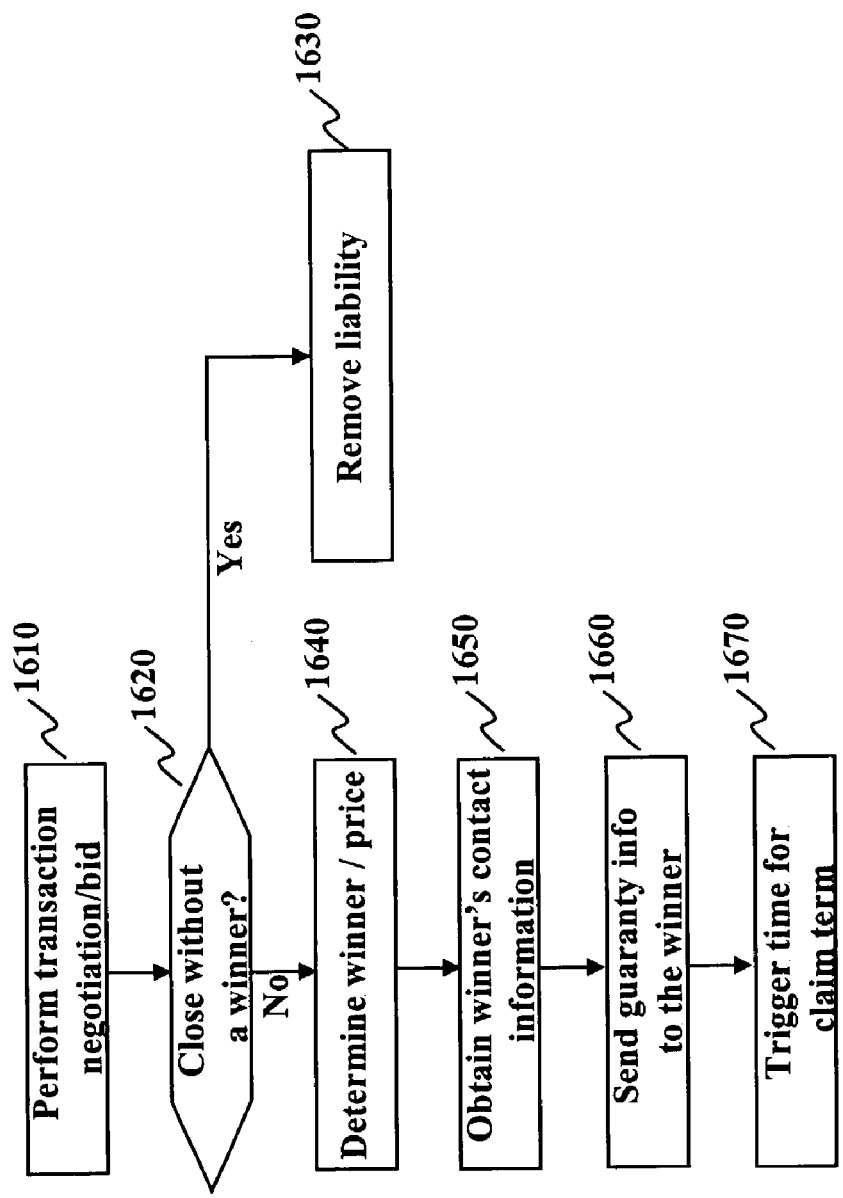
FIG. 16 is a flowchart of an exemplary process, in which a transaction performance guaranty is bound to a transaction when the transaction is closed, according to an embodiment of the inventions.

FIG. 16 is a flowchart of an exemplary process, in which a Transaction performance guaranty bound to a transaction is bound when the transaction is closed. Negotiation or bidding involving a registered transaction is first performed at 1610. If the transaction is closed without a winner, determined at 1620, the liability registered against the subscriber is removed at 1630.

If the transaction is closed with a winner, the winner and the closing price are determined at 1640. The contact information of the winner is then obtained, at 1650, before the safe transaction service provider 130 sends, at 1660, information related to the performance guaranty bound to the closed transaction to the winner. A timer is triggered, at 1670, to start measuring the lapse of time against a term attached to the performance guaranty within which the winner may exercise the performance guaranty.

Figure 17:
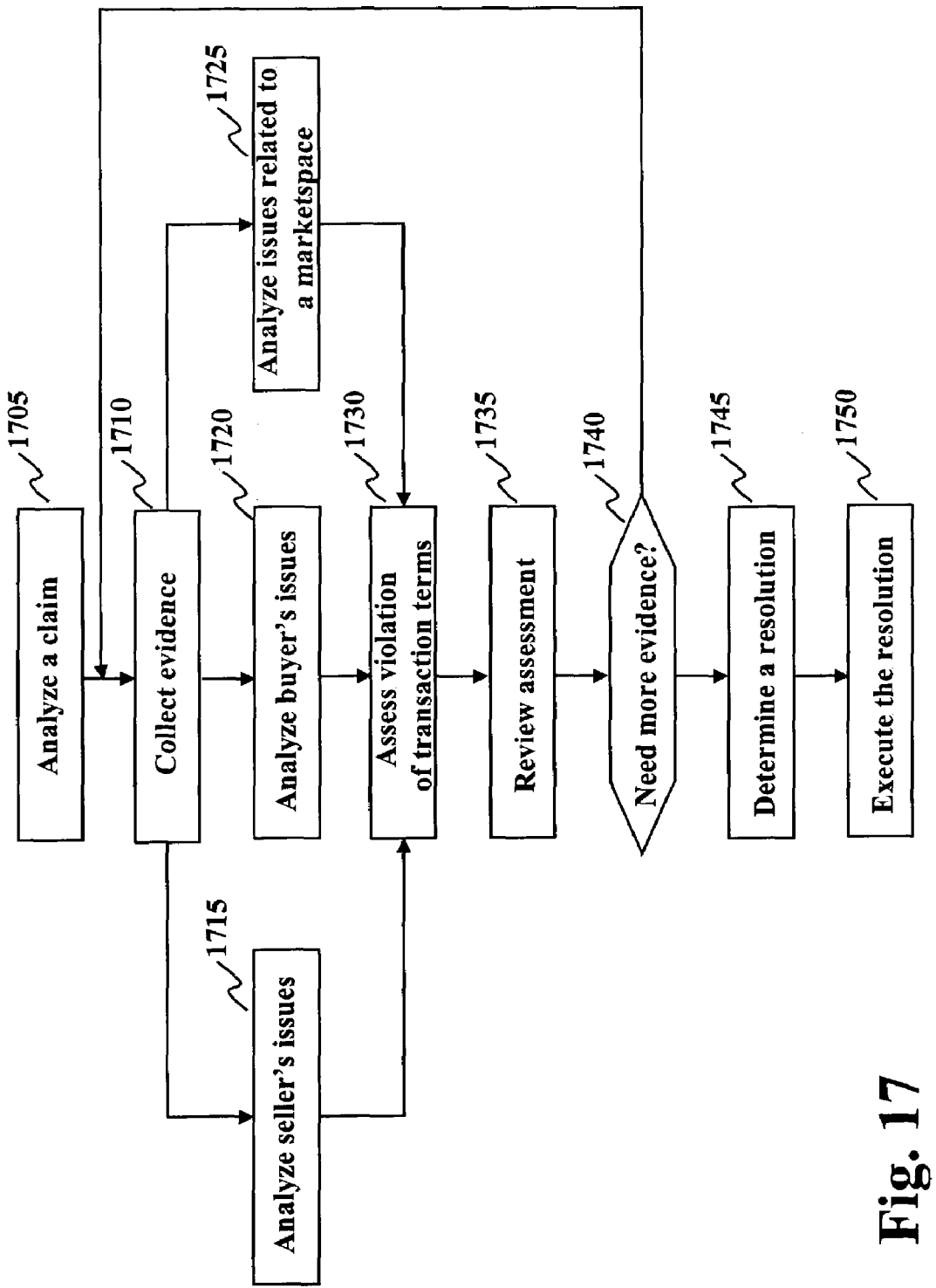
FIG. 17 is a flowchart of an exemplary process, in which a claim filed in compliance with a transaction performance guaranty is processed, according to an embodiment of the inventions.

FIG. 17 is a flowchart of an exemplary process, in which a claim filed under a transaction performance guaranty is processed. The received claim is first analyzed at 1705. Certain evidence may be collected, at 1710, and used in analyzing seller's issues (at 1715), buyer's issues (at 1720), and issues related to a marketspace (at 1725). The claimed violation of a transaction term is assessed at 1730 and such an assessment is reviewed at 1735. If more evidence is needed to determine a resolution, determined at 1740, the process returns to 1710 to collect more evidence and perform more analysis based on newly collected evidence. This process repeats until there is enough evidence to enable a resolution determination made at 1745. The resolution is then executed at 1750.

Figure 18:
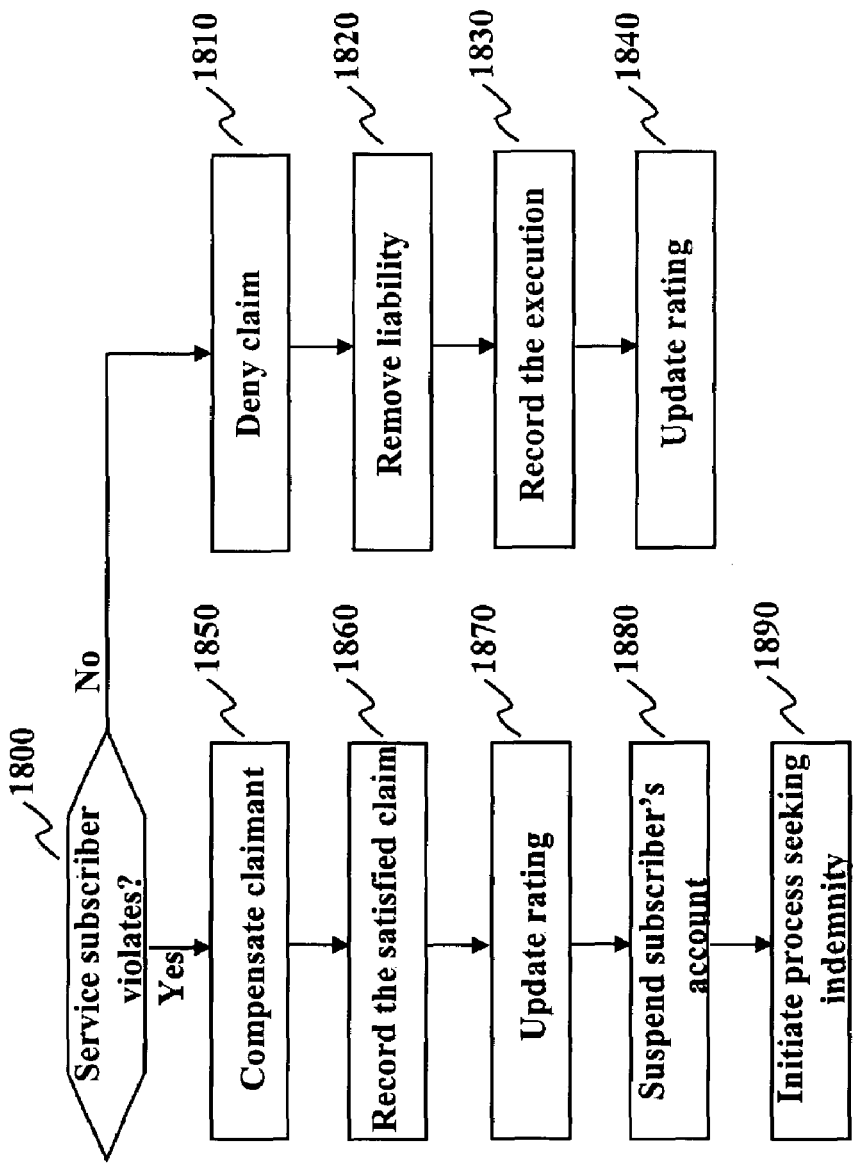
FIG. 18 is a flowchart of an exemplary process, in which a claim is handled according to a resolution, according to an embodiment of the inventions.

FIG. 18 is a flowchart of an exemplary process, in which a claim resolution is executed. If it is determined that the service subscriber did not violate any term of the transaction, determined at 1800, the claim is denied at 1810. The liability registered against the service subscriber is removed at 1820. The execution of the resolution is recorded at 1830. The rating of the subscriber, if any, is then updated at 1840. The update may be made according to different factors such as the degree of fault.

If the subscriber is at fault, compensation is made to the claimant at 1850. Satisfaction of the claim is recorded at 1860. The rating of the subscriber is then updated at 1870 according to, for example, the nature of the violation or the amount of compensation paid to the claimant or a combination of such related factors. The account of the subscriber may be suspended at 1880 (e.g., a decision as to whether the account is to be suspended may be made according to a service policy or terms of the service). A procedure seeking indemnity is then initiated at 1890.

Figure 19:
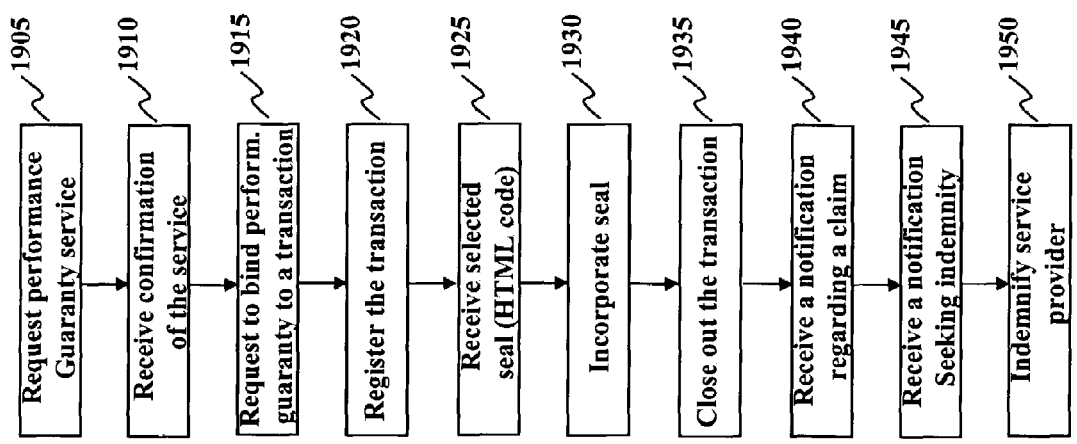
FIG. 19 is a flowchart of an exemplary process, in which a party subscribes to a transaction performance guaranty service and operates in compliance with the terms defined by the transaction performance guaranty service, according to an embodiment of the inventions.

FIG. 19 is a flowchart of an exemplary service subscriber process. A request for obtaining a transaction performance guaranty service is first sent, at 1905, to the safe transaction service provider 130. When the application is approved, the subscriber receives, at 1910, a confirmation or notification from the safe transaction service provider 130.

Under the transaction performance guaranty service, the subscriber requests, at 1915, the safe transaction service provider 130 to bind a performance guaranty to each individual transaction. To be bound, the subscriber first registers, at 1920, the transaction. After registration, the subscriber receives, at 1925, a seal (e.g., in HTML code) generated to indicate the requested binding. The seal is then incorporated, at 1930, in the posted transaction.

The transaction may then be closed at 1935. If there is a dispute as to whether the subscriber violates a term of the closed transaction, the subscriber may receive, at 1940, a notification from the safe transaction service provider 130 regarding a claim filed against the subscriber. If the claim is resolved in favor of the claimant, the subscriber may further receive, at 1945, a notification from the safe transaction service provider 130, seeking indemnity. The subscriber then indemnifies, at 1950, the safe transaction service provider 130.

FIG. 20 is a flowchart of an exemplary service beneficiary process. A transaction with a performance guaranty service is first examined at 2010. The service beneficiary enters, at 2020, the transaction. When the transaction is closed out, the beneficiary receives, at 2030, information related to the performance guaranty. When the other party involved in the transaction who is the subscriber of the performance guaranty, fails to perform according to the terms of the transaction, the beneficiary files, at 2040, a claim against the subscriber with the safe transaction service provider 130. Upon request, the beneficiary provides, at 2050, information related to the subscriber's violation of the transaction term to the safe transaction service provider 130. After the safe transaction service provider 130 reaches a claim resolution, the beneficiary is informed, at 2060, about the resolution.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method, comprising:
   receiving, by at least one computer application program running on a computer of a safe transaction service provider, a request from a first party for obtaining a transaction performance guaranty service with respect to an online commercial transaction following closing of the online commercial transaction;
   processing, by at least one computer application program running on the safe transaction service provider computer, the request by underwriting the first party in order to provide the transaction performance guaranty service to the first party,
   wherein the computer of the safe transaction service provider offers, via a computer network, the transaction performance guaranty service that binds a transaction performance guaranty to the online commercial transaction involving the first party to guarantee the performance of the first party following closing of the online commercial transaction.

2. The method according to claim 1, wherein the transaction performance guaranty service provider is an underwriter.

3. The method according to claim 1, wherein the safe transaction service provider provides the transaction performance guaranty service on behalf of one or more independent underwriters.

4. The method according to claim 1, wherein the online commercial transaction is conducted at a marketspace provided by a marketspace provider.

5. The method according to claim 4, wherein the marketspace corresponds to an online marketspace.

6. The method according to claim 5, wherein the marketspace provider is an online auction marketspace provider.

7. The method according to claim 6, wherein the online auction marketspace provider is one of the following: eBay; uBid; Amazon Auctions; and Yahoo Auctions.

8. The method according to claim 4, wherein the transaction performance guaranty service is offered to the first party through the marketspace provider.

9. The method according to claim 4, wherein the transaction performance guaranty service is offered to the first party by the marketspace provider.

10. The method according to claim 1, wherein: the transaction performance guaranty enables a second party involved in an online commercial transaction with the first party to make a claim when the first party violates a term of the transaction, wherein the second party is a beneficiary of the transaction performance guaranty; and the first party becomes liable to the safe transaction service provider for an amount associated with a claim amount paid to the second party in case of the first party's failure to perform in compliance with a term of the transaction.

11. The method according to claim 10, wherein the first party is a service subscriber; and the second party is a service beneficiary.

12. The method according to claims 10, wherein the first party is one of: a seller in the online commercial transaction; and a buyer in the online commercial transaction.

13. The method according to claim 10, wherein the second party is one of: a buyer in the online commercial transaction; and a seller in the online commercial transaction.

14. The method according to claim 1,
   wherein the transaction performance guaranty is provided in one form of: a surety bond; a specialized bank guaranty;
   a specialized insurance policy; and a safe transaction guaranty provided by the safe transaction service provider.

15. The method according to claim 1, wherein said processing the request comprises:
   collecting information relevant to applying the transaction performance guaranty service;
   conducting pre-screening on the first party; underwriting the first party if the pre- screening is satisfactory;
   validating the first party if said underwriting is successful;
   establishing a service account if said validating is successful.

16. The method according to claim 15, wherein said pre-screening is performed by means of at least one of: a risk evaluation; a scoring data analysis; a random auditing; and a special review process.

17. The method according to claim 16, wherein the scoring data includes:
   credit scores collected from one or more credit agencies;
   rating scores accessible from one or more external rating agencies rating scores derived internally by the safe transaction service provider,
   wherein the internal rating scores are computed based on at least one of:
   individual ratings collected over time, and
   benchmarking ratings evaluated based on a group of individuals.

18. The method according to claim 15, further comprising:
   generating a first authentication key for the approved service provided to the first party after the service account is established; and
   notifying the first party of the approved service request and the first authentication key.

19. The method according to claim 1, further comprising:
   receiving, from the first party after a successful underwriting, a transaction binding request to bind, under the transaction performance guaranty service provided to the first party, a transaction performance guaranty to a specific online commercial transaction; and
   binding, as a response to the binding request and following closing of the online commercial transaction, a transaction performance guaranty to the specific online commercial transaction.

20. The method according to claim 19, wherein prior to said binding, the method comprises:
   registering, by the first party, the specific online commercial transaction with the safe transaction service provider; and
   performing, by the safe transaction service provider, an exposure validation to determine the current total liability registered against the first party.

21. The method according to claim 20, wherein said registering comprises at least one of:
   specifying an item involved in the specific transaction;
   specifying a quantity of the item involved in the specific transaction;
   indicating a unit price associated with the item; and
   describing a term related to the specific transaction.

22. The method according to claim 20, wherein the method further comprises:

generating a second authentication key associated with the specific online commercial transaction involving the first party;

generating a seal that represents the bound transaction performance guaranty service for the specific online commercial transaction;

incorporating the seal into the posting of the specific online commercial transaction, indicating that there is a bound transaction performance guaranty service associated with the specific online commercial transaction; and registering liability associated with the specific transaction against the first party.

23. The method according to claim 22, further comprising selecting the seal from a plurality of predetermined seal types.

24. The method according to claim 22, wherein said seal is generated in the form including at least one of: an HTML code; and an XML code.

25. The method according to claim 22, wherein said incorporating the seal is through at least one of:
a manual incorporation process, wherein the seal representation is sent to the first party and is manually inserted into the posting for the specific transaction;
an automatic incorporation process, wherein the automatic incorporation is achieved through at least one of:
a periodic check and posting operation conducted according to a predetermined interval;
an implicit request driven operation invoked by the first party whenever there is a new online commercial transaction is posted; and
an explicit request driven operation invoked by the first party with a specified online commercial transaction to which a seal is to be posted.

26. The method according to claim 22, further comprising activating a first timer for measuring the duration of the specific online transaction according to a term of the specific online transaction.

27. The method according to claim 22, further comprising closing the specific online transaction.

28. The method according to claim 27, wherein said closing comprises:
determining a winner who is to be involved in the final specific online transaction;
determining a total price of the specific online transaction if there is a winner;
sending information related to the transaction performance guaranty bound to the specific online transaction to the winner.

29. The claim according to claim 28, wherein the binding of the transaction performance guaranty to the specific online transaction comprises issuing the guaranty to the winner in a form selected by the first party to deliver the service; and
triggering a second timer for measuring the amount of time between the binding of the transaction performance guaranty and when a claim is received against a predetermined time period.

30. The method according to claim 28, further comprising removing the liability associated with the specific online transaction and registered against the first party when there is no winner.

31. The method according to claim 19, further comprising:
receiving a claim from a winner involved in the specific online transaction with the first party;
determining whether the claim is received within a predetermined time period measured from when the transaction performance guaranty was bound to the specific online transaction;
declining the claim if the claim is received after the predetermined time period; and
processing the claim if the claim is received within the predetermined time period.

32. The method according to claim 31, wherein said processing the claim comprises:
collecting information related to the claim;
analyzing issues related to the claim;
determining a dispute resolution according to the information collected and the results produced by said analyzing; and
carrying out the resolution determined.

33. The method according to claim 32, wherein the issues related to the claim include at least one of:
issues raised by the winner;
issues raised by the first party; and
issues related to a marketspace provider.

34. The method according to claim 32, wherein said carrying out the resolution comprises:
resolving the dispute in favor of the first party if it is determined that the first party does not violate a term of the specific online transaction;
resolving the dispute in favor of the winner if it is determined that the first party violates a term of the specific online transaction.

35. The method according to claim 34, wherein said resolving in favor of the first party comprises:
declining the claim made by the winner of the specific online transaction; and
removing the liability associated with the specific online transaction and registered against the first party.

36. The method according to claim 35, wherein said resolving in favor of the winner comprises:
making a payment to the winner in a claim amount; and
initiating a process seeking indemnity from the first party in compliance with the transaction performance guaranty service agreement with the first party.

37. The method according to claim 36, further comprising suspending the transaction performance guaranty service associated with the first party.

38. The method according to claim 34, further comprising updating a rating score associated with at least one of: the first party; and the winner.

39. A machine readable medium, encoded with instructions, that when executed by a machine, result in the following:
receiving, by at least one computer application running on a computer of a safe transaction service provider, a request from a first party for obtaining a transaction performance guaranty service with respect to an online commercial transaction;
processing, by at least one computer application running on the safe transaction service provider computer, the request by underwriting the first party in order to provide the transaction performance guaranty service to the first party,
wherein the safe transaction service provider computer offers, via computer network, the transaction performance guaranty service that binds a transaction performance guaranty to the online commercial transaction involving the first party to guarantee the performance of the first party in response to a closing of the online commercial transaction.

40. The medium according to claim 39, wherein:
the transaction performance guaranty enables a second party involved in an online commercial transaction with the first party to make a claim when the first party violates a term of the transaction, wherein the second party is a beneficiary of the transaction performance guaranty; and the first party becomes liable to the safe transaction service provider for an amount associated with a claim amount paid to the second party in case of the first party's failure to perform in compliance with a term of the transaction.

41. The medium according to claim 40, wherein the first party is a service subscriber; and the second party is a service beneficiary.

42. The medium according to claims 40, wherein the first party is one of: a seller in the online commercial transaction; and a buyer in the online commercial transaction.

43. The medium according to claim 40, wherein the second party is one of:

a buyer in the online commercial transaction; and a seller in the online commercial transaction.

44. The medium according to claim 39, wherein the transaction performance guaranty is provided in one form of:

a surety bond;

a specialized bank guaranty;

a specialized insurance policy; and a safe transaction guaranty provided by the safe transaction service provider.

45. The medium according to claim 39, wherein said processing the request comprises:

collecting information relevant to applying the transaction performance guaranty service;

conducting pre-screening on the first party;

underwriting the first party if the pre-screening is satisfactory;

validating the first party if said underwriting is successful; and establishing a service account if said validating is successful.

46. The medium according to claim 39, the instructions, when executed by a machine, further result in:

receiving, from the first party after a successful underwriting, a transaction binding request to bind, under the transaction performance guaranty service provided to the first party, a transaction performance guaranty to a specific online commercial transaction; and binding, as a response to the binding request and following closing of the specific online commercial transaction, a transaction performance guaranty to the specific online commercial transaction.

47. The medium according to claim 46, wherein prior to the binding, the instructions, when executed by a machine, further result in:

registering, by the first party, the specific online commercial transaction with the safe transaction service provider; and performing, by the safe transaction service provider, an exposure validation to determine the current total liability registered against the first party.

48. The medium according to claim 47, wherein the instructions, when executed by a machine further result in:

generating a second authentication key associated with the specific online commercial transaction involving the first party;

generating a seal that represents the transaction performance guaranty service for the specific online commercial transaction;

incorporating the seal into the posting of the specific online commercial transaction, indicating that there is a bound transaction performance guaranty service associated with the specific online commercial transaction; and registering liability associated with the specific transaction against the first party.

49. The medium according to claim 39, further comprising closing the specific online transaction, which comprises:

determining a winner who is to be involved in the final specific online transaction;

determining a total price of the specific online transaction if there is a winner;

sending information related to the transaction performance guaranty bound to the specific online transaction to the winner.

50. The medium according to claim 49, wherein the binding of the transaction performance guaranty comprises issuing the guaranty to the winner in a form selected by the first party to deliver the service; and triggering a second timer for measuring the amount of time between the binding of the transaction performance guaranty and when a claim is received against a predetermined time period.

51. The medium according to claim 50, further comprising:

receiving a claim from a winner involved in the specific online transaction with the first party;

determining whether the claim is received within a predetermined time period measured from when the transaction performance guaranty was bound to the specific online transaction;

declining the claim if the claim is received after the predetermined time period; and processing the claim if the claim is received within the predetermined time period.

52. The medium according to claim 51, wherein said processing the claim comprises:

collecting information related to the claim;

analyzing issues related to the claim;

determining a dispute resolution according to the information collected and the results produced by said analyzing; and carrying out the resolution determined.

\* \* \* \* \*